(12) United States Patent
Nair et al.

(10) Patent No.: US 12,370,499 B2
(45) Date of Patent: Jul. 29, 2025

(54) MEMBRANES, SYSTEMS, AND METHODS FOR CONCENTRATING LIQUOR STREAMS RELATED TO BIOMASS PULPING

(71) Applicant: Georgia Tech Research Corporation, Atlanta, GA (US)

(72) Inventors: Sankar Nair, Atlanta, GA (US); Chen Ma, Atlanta, GA (US); Meisha Shofner, Atlanta, GA (US); Scott Sinquefield, Atlanta, GA (US); Zhongzhen Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 643 days.

(21) Appl. No.: 17/612,530

(22) PCT Filed: May 22, 2020

(86) PCT No.: PCT/US2020/034330
§ 371 (c)(1),
(2) Date: Nov. 18, 2021

(87) PCT Pub. No.: WO2020/237191
PCT Pub. Date: Nov. 26, 2020

(65) Prior Publication Data
US 2022/0370960 A1      Nov. 24, 2022

Related U.S. Application Data

(60) Provisional application No. 62/852,247, filed on May 23, 2019, provisional application No. 62/852,260, filed on May 23, 2019.

(51) Int. Cl.
| | |
|---|---|
| *B01D 69/10* | (2006.01) |
| *B01D 67/00* | (2006.01) |
| *B01D 69/12* | (2006.01) |
| *B01D 71/02* | (2006.01) |
| *C02F 1/44* | (2023.01) |

(52) U.S. Cl.
CPC ....... *B01D 67/00416* (2022.08); *B01D 69/10* (2013.01); *B01D 69/1213* (2022.08); *B01D 71/0211* (2022.08); *C02F 1/44* (2013.01)

(58) Field of Classification Search
None
See application file for complete search history.

(56) References Cited

U.S. PATENT DOCUMENTS

| | | |
|---|---|---|
| 2006/0016751 A1 | 1/2006 | Ali et al. |
| 2017/0341034 A1 | 11/2017 | Dave et al. |
| 2018/0071684 A1* | 3/2018 | Nair ........... B01D 69/02 |
| 2018/0339906 A1 | 11/2018 | Lu et al. |

FOREIGN PATENT DOCUMENTS

| | | |
|---|---|---|
| WO | 2018/178706 A2 | 10/2018 |
| WO | 2018178706 A9 | 10/2018 |

OTHER PUBLICATIONS

Hu M, Mi B. Enabling graphene oxide nanosheets as water separation membranes. Environ Sci Technol. Apr. 16, 2013;47(8):3715-23. doi: 10.1021/es400571g. Epub Apr. 1, 2013. PMID: 23488812. (Year: 2013).*
Peng et al. Label-free electrochemical DNA biosensor for rapid detection of mutidrug resistance gene based on Au nanoparticles / toluidineblue-graphene oxide nanocomposites (Year: 2014).*
Label-free electrochemical DNA biosensor for rapid detection of mutidrug resistance gene based on Au nanoparticles / toluidineblue—graphene oxide nanocomposites (Year: 2014).*
International Search Report and Written Opinion from Application No. PCT/US2020/034330 dated Dec. 17, 2020.
Hu, et al., "Enabling Graphene Oxide Nanosheets as Water Separation Membranes," Mar. 14, 2013 Env. Sci and Tech., vol. 47 pp. 3715-3723.
Huang, et al., "Graphene-Based Membranes for Molecular Separation," Jun. 24, 2015 J. Phys. Chem. Lett, vol. 6 pp. 2806-2815.
Rashidi, et al., "Graphene Oxide Membranes in Extreme Operating Environments: Concentration of Kraft Black Liquor by Lignin Retention," Dec. 9, 2016 ACS Sustainable Chem. Engg. vol 5, pp. 1002-1009.
Wang, et al., "High_Performance Graphene Oxide Nanofiltration Membranes for Black Liquor Concentration," Jul. 30, 2019ACS Sustainable Chem. Engg. vol 7, pp. 14915-14923.
Search Report from EP Application No. 20809712 dated Apr. 25, 2023.
Xu, et al., "Graphene Oxide Nanofiltration Membranes Stabilized by Cationic Porphyrin for High Salt Rejection," May 9, 2016 vol. 8, No. 20 pp. 12588-12593.

(Continued)

*Primary Examiner* — Krishnan S Menon
*Assistant Examiner* — Tak L Chiu
(74) *Attorney, Agent, or Firm* — Troutman Pepper Locke LLP; Ryan A. Schneider; Nicholas H. Doss

(57) ABSTRACT

Disclosed herein are membranes comprising: porous substrate; and two or more graphene oxide (GO) sheets disposed on the porous substrate, each GO layer comprising a plurality of GO flakes, each GO flake comprising a planar graphene structure with oxygen moieties extending therefrom, wherein the membrane, when a pressure from 10 bar to 50 bar of transmembrane pressure is applied from 1 hour to 48 hours, has an aqueous flux wherein the aqueous flux changes by 5% or less while the pressure is applied. The membranes can also include an intercalating agent disposed between the two or more GO sheets, the intercalating agent interacting with each GO sheet, wherein the intercalating agent provides a non-covalent stabilization of the two or more GO sheets. Also disclosed herein are methods of making and using the same and systems for implementing the same.

10 Claims, 17 Drawing Sheets

(56) References Cited

OTHER PUBLICATIONS

Xu, et al., "S-1 Supporting Information Graphene Oxide Nanofiltration Membranes Stailized by Cationic Porphyrin for High Salts Rejection," National Synergetic Innovation Center for Advanced Materials, May 9, 2016 pp. 1-14.

Hu, et al., "Layer-by-Layer Assembly of Graphene Oxide Membranes via Electrostatic Interaction," Jun. 24, 2014 Journal of Membrane Science vol. 469, pp. 80-87.

Chen Liang, et al., "Ion Sieving in Graphene Oxide Membranes via Cationic Control of Interlayer Spacing," Oct. 19, 2017 Nature vol. 550, No. 7676 pp. 380-383.

Ye Junzhang, et al., "Tailored Graphene Oxide Membranes for the Separation of Ions and Molecules," Sep. 11, 2019, ACS Applied Nano Materials vol. 2, No. 10 pp. 6611-6621.

Hussain, et al. " Highly Stable grapheneGOxide-Based Membranes wiht Superior Permeabiity," Apr. 16, 2018 Nature Communications vol. 9, No. 1.

Wojtoniszak, et al., "Graphene Oxide Funtionalized with Methylene Blue and Its Performance in Singlet Oxygen Generation," Apr. 1, 2013 Materials Research Bulletin vol. 48, No. 7 pp. 2636-2639.

\* cited by examiner

MEMBRANES, SYSTEMS, AND METHODS FOR CONCENTRATING LIQUOR STREAMS RELATED TO BIOMASS PULPING

CROSS-REFERENCE TO RELATED APPLICATIONS

This application claims the benefit of U.S. Provisional Application Ser. No. 62/852,260, filed on 23 May 2019, and U.S. Provisional Application Ser. No. 62/852,247, filed on 23 May 2019, the entire contents and substance of each being incorporated herein by reference in its entirety as if fully set forth below.

STATEMENT OF RIGHTS UNDER FEDERALLY SPONSORED RESEARCH

This invention was made with government support under Contract No. EE0007888 awarded by the U.S. Department of Energy. The government has certain rights in the invention.

FIELD OF THE DISCLOSURE

The present disclosure relates generally to membrane systems and methods. Particularly, embodiments of the present disclosure relate to membrane systems and methods for black liquor purification.

BACKGROUND

Black liquor (BL) concentration by multi-effect evaporation is an extremely energy-intensive operation in the kraft pulping cycle. Membranes can significantly save energy in this process, but conventional membranes are strongly challenged by low solute rejections and poor stability in BL, which is a complex mixture containing dissolved lignin, other non-lignin organics, multiple inorganic salts at highly alkaline pH and process temperatures of 70-85° C. The extreme operating conditions of BL processing, such as high alkaline pH (>12.5), high total solids content (>15 wt %), and elevated temperature (70-85° C.), lead to unique challenges in development of robust separation processes that can also provide high water fluxes and high solids rejections. Additionally, there is a very large molecular weight distribution inherent in the BL composition. A typical kraft BL contains lignin (0.5-10 kDa), other organics (0.2-0.8 kDa), and inorganic salts (<0.2 kDa).

What is needed, therefore, are improved separation systems and methods that are stable in a feed under the harsh conditions of black liquor while having high solute rejections to permeate a pure product. Embodiments of the present disclosure address this need as well as other needs that will become apparent upon reading the description below in conjunction with the drawings.

BRIEF SUMMARY OF THE INVENTION

The present disclosure relates generally to membrane systems and methods. Particularly, embodiments of the present disclosure relate to membrane systems and methods for black liquor purification. An exemplary embodiment of the present disclosure can provide a method of making a membrane, the method comprising: forming a first suspension comprising water and graphene oxide (GO); mixing a base into the first suspension to form a second suspension; vacuum filtering the second suspension onto a membrane support to form a membrane; and conditioning the membrane under a pressure of 10 bar or greater until a flux of the membrane changes less than 5% per hour.

In any of the embodiments disclosed herein, the GO can have a concentration in the first suspension from 1 g/L to 50 g/L.

In any of the embodiments disclosed herein, the GO can have a concentration in the second suspension from 1 g/L to 50 g/L.

In any of the embodiments disclosed herein, forming the suspension can comprise: forming a GO paste; centrifuging the GO paste to form a first bottom solids component; washing the first bottom solids component; centrifuging the first bottom solids component to form a second bottom solids component; washing the second bottom solids component to form a GO material; and suspending the GO material in water to form the suspension.

In any of the embodiments disclosed herein, the membrane support can comprise poly(ethersulfone) and the base can comprise an alkali material.

In any of the embodiments disclosed herein, the method can further comprise dispersing, prior to vacuum filtering, an intercalating agent in the graphene oxide, wherein molecules of the intercalating agent interact with one another and with the GO through one or more of: $\pi$-$\pi$ or electrostatic interactions.

In any of the embodiments disclosed herein, the intercalating agent can comprise polycyclic dye toluidine blue O (TBO).

In any of the embodiments disclosed herein, the intercalating agent can have a mass ratio compared to GO of from 1:1 to 1:20.

In any of the embodiments disclosed herein, the conditioning can comprise applying a pressure from about 10 bar to about 50 bar.

In any of the embodiments disclosed herein, the conditioning can cause the membrane to have an aqueous flux change of 5% or less when the pressure is applied from 1 hour to 48 hours.

In any of the embodiments disclosed herein, the membrane, when fed with a black liquor solution comprising 15% weight solids in water, can have a lignin rejection of 98% or greater when under from about 10 bar to about 50 bar of transmembrane pressure.

In any of the embodiments disclosed herein, the membrane, when fed with a black liquor solution comprising 15% weight solids in water, can have a total organic carbon rejection of 80% or greater when under from about 10 bar to about 50 bar of transmembrane pressure.

In any of the embodiments disclosed herein, the membrane, when fed with a black liquor solution comprising 15% weight solids in water, can have a total solids rejection of 50% or greater when under from about 10 bar to about 50 bar of transmembrane pressure.

Another embodiment of the present disclosure can provide a membrane comprising: a porous substrate; two or more graphene oxide (GO) sheets disposed on the porous substrate, each GO layer comprising a plurality of GO flakes, each GO flake comprising a planar graphene structure with oxygen moieties extending therefrom; and an intercalating agent disposed between the two or more GO sheets, the intercalating agent interacting with each GO sheet, wherein the intercalating agent provides a non-covalent stabilization of the two or more GO sheets.

In any of the embodiments disclosed herein, molecules of the intercalating agent can interact with each GO sheet and each other through one or more of: π-π or electrostatic interactions.

In any of the embodiments disclosed herein, the porous substrate can include a macroporous polymer substrate comprising at least one of poly(sulfone) and poly(ethersulfone).

In any of the embodiments disclosed herein, the intercalating agent can include a compound having π-conjugated polycyclic cations.

In any of the embodiments disclosed herein, the intercalating agent can comprise polycyclic dye toluidine blue O (TBO).

In any of the embodiments disclosed herein, the intercalating agent can have a mass ratio compared to GO of from 1:1 to 1:20.

In any of the embodiments disclosed herein, the membrane, when fed with black liquor solution comprising 15% weight solids in water, can have a lignin rejection of 98% or greater when under from about 10 bar to about 50 bar of transmembrane pressure.

In any of the embodiments disclosed herein, the membrane, when fed with a black liquor solution comprising 15% weight solids in water, can have a total organic carbon rejection of 80% or greater when under from about 10 bar to about 50 bar of transmembrane pressure.

In any of the embodiments disclosed herein, the membrane, when fed with a black liquor solution comprising 15% weight solids in water, can have a total solids rejection of 50% or greater when under from about 10 bar to about 50 bar of transmembrane pressure.

Another embodiment of the present disclosure can provide a membrane comprising: porous substrate; and two or more graphene oxide (GO) sheets disposed on the porous substrate, each GO layer comprising a plurality of GO flakes, each GO flake comprising a planar graphene structure with oxygen moieties extending therefrom, wherein the membrane, when a pressure from 10 bar to 50 bar of transmembrane pressure is applied from 1 hour to 48 hours, has an aqueous flux wherein the aqueous flux changes by 5% or less while the pressure is applied.

In any of the embodiments disclosed herein, the porous substrate can include a macroporous polymer substrate comprising at least one of poly(sulfone) and poly(ethersulfone).

In any of the embodiments disclosed herein, the membrane, when fed with a black liquor solution comprising 15% weight solids in water, can have a lignin rejection of 98% or greater when under from about 10 bar to about 50 bar of transmembrane pressure.

In any of the embodiments disclosed herein, the membrane, when fed with a black liquor solution comprising 15% weight solids in water, can have a total organic carbon rejection of 80% or greater when under from about 10 bar to about 50 bar of transmembrane pressure.

In any of the embodiments disclosed herein, the membrane, when fed with a black liquor solution comprising 15% weight solids in water, can have a total solids rejection of 50% or greater when under from about 10 bar to about 50 bar of transmembrane pressure.

Another embodiment of the present disclosure can provide a method of purifying black liquor, the method comprising: feeding, to the membrane of any of the embodiments disclosed herein, a black liquor feedstock comprising solids and water, wherein the solids are present in the black liquor feedstock in an amount from 1% to 50% by weight of the total feedstock; producing a permeate stream including one or more purified products that have passed through the membrane; and obtaining a retentate stream including one or more rejected components that have not passed through the membrane, wherein the black liquor feedstock is fed to the membrane under a transmembrane pressure from 10 bar to 50 bar.

Another embodiment of the present disclosure can provide a method of purifying black liquor, the method comprising: feeding, to the membrane of any of the embodiments disclosed herein, a black liquor feedstock comprising solids and water, wherein the solids are present in the black liquor feedstock in an amount from 1% to 50% by weight of the total feedstock; producing a permeate stream including one or more purified products that have passed through the membrane; and obtaining a retentate stream including one or more rejected components that have not passed through the membrane, wherein the black liquor feedstock is fed to the membrane under a transmembrane pressure from 10 bar to 50 bar.

Also disclosed herein are systems for purifying black liquor, the system comprising: a membrane unit including the membrane of any of the embodiments disclosed herein; a feed line connected to the membrane unit and configured to supply a black liquor feedstock to the membrane unit, the black liquor feedstock comprising dissolved solids and water; a permeate line connected to the membrane unit and configured to receive a permeate flow exiting the membrane; and a retentate line connected to the membrane unit and configured to receive a retentate flow rejected by the membrane.

In any of the embodiments disclosed herein, the membrane unit can be configured to operate under from 10 bar to 50 bar of transmembrane pressure.

In any of the embodiments disclosed herein, the solids can be present in the black liquor feedstock in an amount from 1% to 50% by weight of the black liquor feedstock.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
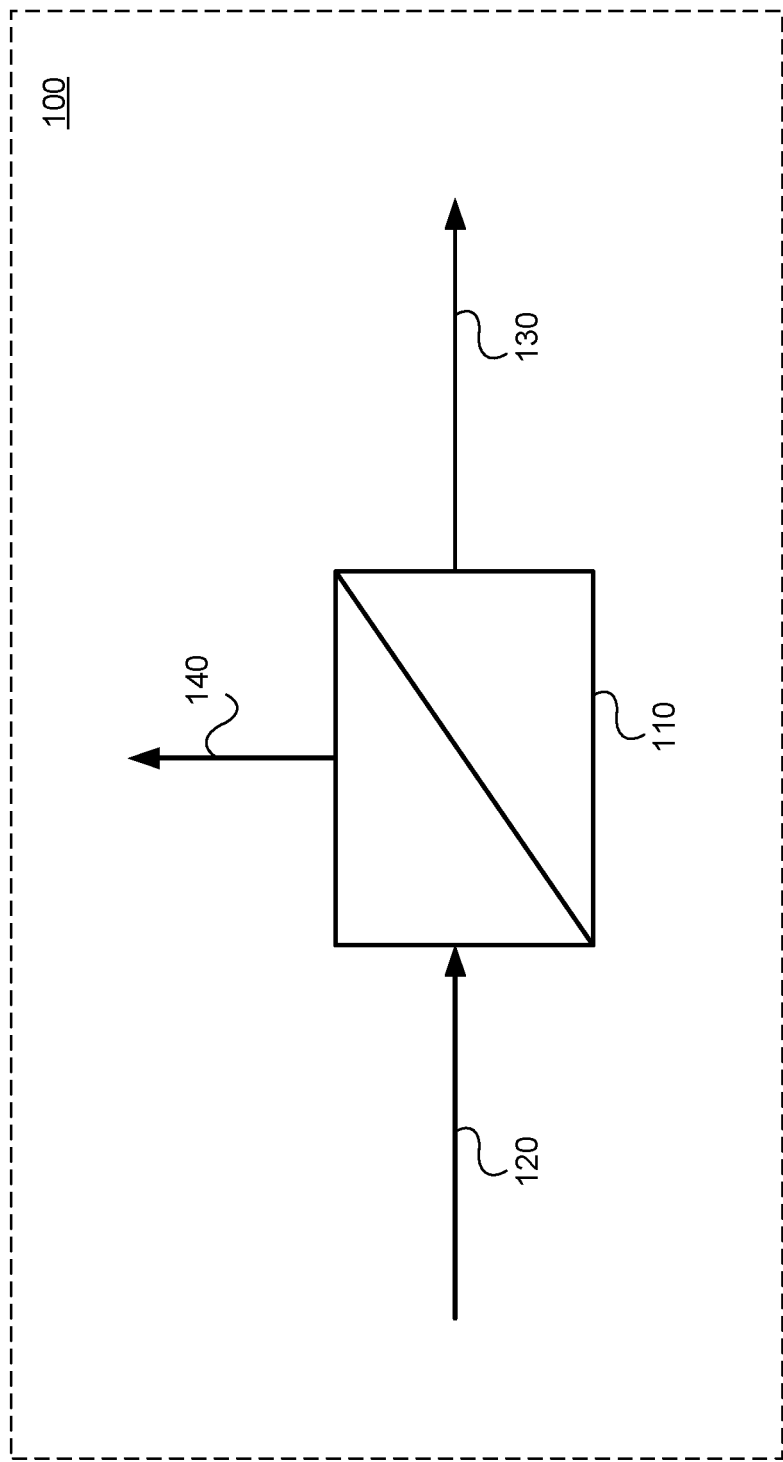
FIG. 1 illustrates a system for purifying water from liquor streams in accordance with some examples of the present disclosure.

Membrane-based BL concentration (or dewatering) has long been proposed as a desirable alternative that can provide significant energy savings (>30%), and the advantage of membranes over evaporation-based dewatering can be provided in different applications, especially in seawater desalination where membranes can largely replace evaporation processes. Specifically, dewatering by a membrane can be typically driven by a pressure differential, which costs much less energy than that required to perform a phase change from liquid to vapor during evaporation. The goal of membrane-based dewatering is two-fold: firstly to concentrate BL to around 30-40 wt % TS (total solids) and significantly reduce the evaporator energy load, and secondly to produce process-quality water (about 0.1-1 wt % TS) that can be used to make-up the process-quality water that is no longer produced by evaporation and maintain the overall water balance in the kraft process. Due to the problems described above, however, a single membrane stage cannot achieve the desired two-fold goal, and a combination of nanofiltration (NF) and reverse osmosis (RO) stages is required. In the present disclosure, graphene oxide (GO) nanofiltration membranes have demonstrated their high water permeability, tunable ionic selectivity, better chemical resistance than polymeric membranes, and potentially low manufacturing costs.

Graphene oxide, as a novel membrane material, can show excellent water permeability and tunable ion selectivity, and could be suitable for the separation of complex mixture streams containing a wide variety of components with different molecular weights. For instance, graphene oxide (GO) membranes supported on porous polyethersulfone (PES) supports can be effective for NF treatment of 10 wt % BL, with lignin rejections as high as 97% and showing excellent stability after more than 1 month under BL exposure. While this performance is already comparable to (or greater than) the best polymeric and ceramic membranes that have been evaluated for BL concentration, considerable improvements in GO membranes can be implemented. In order to improve the NF permeate quality (and thus reduce the energy usage as well as minimize the load on the subsequent RO stage), the optimal GO membrane for the NF stage can have near-perfect lignin rejection as well as reasonable organics and salts rejections. These characteristics can be achieved by reducing the interlayer space of the GO membrane to an optimum level by different modification approaches, with the condition that such modified membranes should still remain stable in BL conditions. Prior GO membranes were determined to have a molecular weight cutoff of about 0.63 kDa, and thus allowed significant amounts of lignin and organics, as well as almost all the salts, to pass through.

A major disadvantage of GO membranes has been the dramatic decrease in ion rejections at practically significant ion concentrations, due to screening of electrostatic interactions and interlayer swelling in aqueous environments. Efforts to limit the swelling of GO membranes can be based upon partial reduction, covalent cross-linking, blending with graphene flakes, and intercalation with ions and molecules. Under low (~0.01 M) salt concentrations, NaCl and $Na_2SO_4$ rejections as high as 80-90% can be obtained. However, practical nanofiltration uses must deal with much higher salt concentrations (0.1-1 M) in process water and wastewater streams. In 0.5 M NaCl, the rejection of GO membranes decreased to less than 33%, and in 0.05 M $Na_2SO_4$, it decreased to 67%. The same issue also limits other applications of GO membranes that require solute sieving under high concentrations, such as barrier films for batteries, ion-exchange membranes, and medical dialysis.

Disclosed herein, therefore, are selected chemical and mechanical modifications that can lead to GO membranes with greatly improved NF performance in BL concentrations, with GO membranes showing particularly excellent characteristics while remaining stable under harsh operating conditions. Also disclosed herein is a unique type of microstructural control obtained by strong attachment of π-conjugated polycyclic cations to GO, owing to π-π and electrostatic interactions with the GO sheets. This can limit interlayer swelling, and also can create tunable steric barriers in the 2D interlayer galleries of GO that can increase the path tortuosity as well as narrow the effective lateral spaces for hydrated ion and molecule transport. For instance, disclosed herein is the aforementioned concept using the polycyclic dye toluidine blue O (TBO).

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As used herein, the concentration of liquor streams can refer to the removal of water from a liquor streams to create a more concentrated stream of solids. Alternatively, the concentration of liquor streams can consequently refer to the purification of water by separating concentrated solid constituents from the water. The solid constituents are then concentrated in one stream while the water is purified in another stream. As such, as used herein, the terms "concentration of liquor" and "purification of water" can be used interchangeably as specific functionalities that result from the present disclosure.

It is also understood that, while the present disclosure is described with reference to purifying water and concentrating black liquor, the disclosed membranes, systems, and/or methods can be applied to any liquor streams related to biomass pulping, such as black liquor, weak wash, and the like.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a system 100 for purifying black liquor. As shown, the system 100 can include a membrane unit 110, a feed line 120, a permeate line 130, and a retentate line 140. The membrane unit 110 can contain any of the membranes described herein. The feed line 120 can be connected to the membrane unit 110 and can provide a feedstock to one side of the membrane. For example, the feedstock can be a black liquor feedstock comprising dissolved solids and water. The retentate line 140 can be connected to the membrane unit 110 on the same side of the membrane as the feed line 120 and can receive a flow of components rejected by the membrane. The permeate line 130 can be connected to the membrane unit 110 on the opposite side of the membrane as the feed line 120 and can receive a flow of components permeating through the membrane.

The feed line 120, the permeate line 130, and the retentate line 140 can all be in fluid communication with the membrane unit. The lines can also contain various components to facilitate fluid flow through each respective line, such as valves, pumps, pipes, and the like. Such devices can be configured to meter the flow rate of any of the lines. For instance, various valves can be configured on the lines to ensure that the membrane unit 110 has a desired stage cut. The stage cut can be altered as desired and can be anywhere from 1% to 99%.

The membrane unit 110 can also operate under transmembrane pressure to facilitate flow across the membrane. For example, the transmembrane pressure can be 10 bar or greater (e.g., 20 bar or greater, 30 bar or greater, 40 bar or greater, 50 bar or greater, 60 bar or greater, 70 bar or greater, 80 bar or greater, 90 bar or greater, or 100 bar or greater). In some examples, the transmembrane pressure can be 100 bar or less (e.g., 90 bar or less, 80 bar or less, 70 bar or less, 60 bar or less, 50 bar or less, 40 bar or less, 30 bar or less, 20 bar or less, or 10 bar or less). In some examples, the transmembrane pressure can be from 10 bar to 100 bar (e.g., from 10 bar to 90 bar, from 10 bar to 80 bar, from 10 bar to 70 bar, from 10 bar to 60 bar, from 10 bar to 50 bar, from 10 bar to 40 bar, from 10 bar to 30 bar, from 10 bar to 20 bar, or from 50 bar to 100 bar).

As described, the feed line 120 can provide a black liquor feedstock to the membrane unit 110. The black liquor feedstock can comprise dissolved solids in water. The dissolved solids in water can include various byproducts and/or waste products of the kraft pulping process. For example, the dissolved solids can include organic carbon, lignin, salts, wood pulp, and the like. As would be appreciated, dewatering the black liquor feedstock to separate water from the dissolved solids can create a more efficient solids stream for a recovery boiler in a kraft pulp mill, as well as produce purified water to recycle for necessary processes in a kraft pulp mill.

The various dissolved solids can be present in the feedstock in an amount of 1% or greater (e.g., 5% or greater, 10% or greater, 15% or greater, 20% or greater, 25% or greater, 30% or greater, 35% or greater, 40% or greater, 45% or greater, or 50% or greater) by weight based on the total weight of the feedstock. In some examples, the dissolved solids can be present in the feedstock in an amount of 50% or less (e.g., 45% or less, 40% or less, 35% or less, 30% or less, 25% or less, 20% or less, 15% or less, 10% or less, 5% or less, or 1% or less) by weight based on the total weight of the feedstock. In some examples, the dissolved solids can be present in the feedstock in an amount from 1% to 50% by weight based on the total weight of the feedstock.

Figure 2:
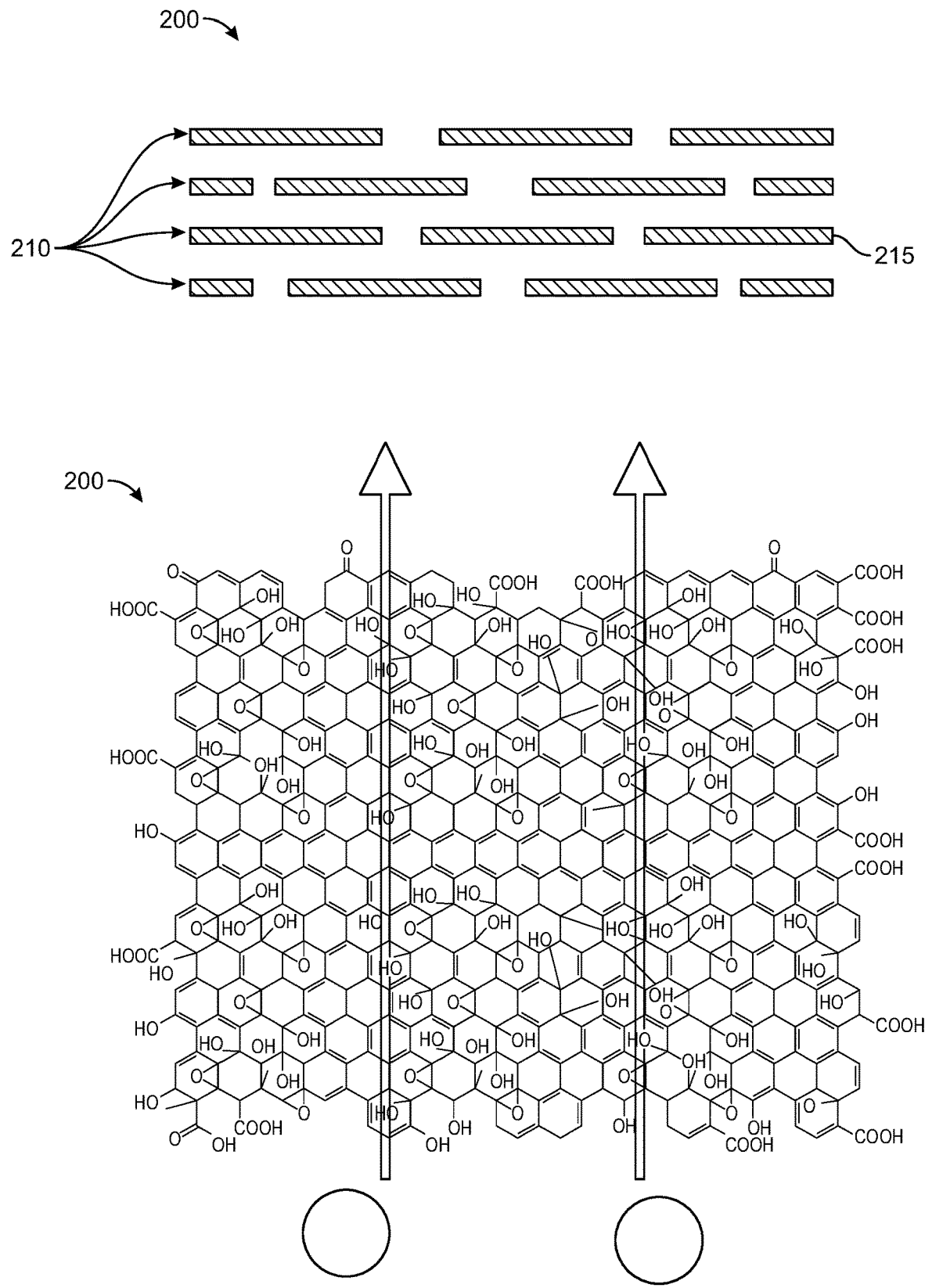
FIG. 2 illustrates a cross-sectional view of a membrane in accordance with some examples of the present disclosure.

FIG. 2 illustrates an example of a membrane 200 used in the membrane unit 110 in greater detail. The membrane 200 can include a porous substrate (not shown) and two or more graphene oxide (GO) sheets 210 disposed on the porous substrate. The porous substrate can be made from poly(sulfone) and/or poly(ethersulfone). The porous substrate can also include other polymers, such as poly(vinylidenefluoride), or polyolefins such as poly(ethylene), poly(propylene), poly(styrene). Each GO layer can comprise a plurality of GO flakes 215. Each of the GO flakes 215 can be in the form of a planar graphene structure with oxygen moieties extending from the graphene plane. A GO flake can refer to GO material in the form of a flake characterized by a longer lateral dimension than its thickness, i.e. a high aspect ratio. E.g., 200 nm laterally and 1 nm thickness has an aspect ratio of 200. In some examples, the GO flakes 215 can have an aspect ratio of 10 or greater (e.g., 15 or greater, 20 or greater, 25 or greater, 30 or greater, 35 or greater, 40 or greater, 45 or greater, or 50 or greater).

In order to reduce the interlayer spacing of the GO sheets and thus increase the NF membrane rejection, a number of membrane modification techniques can be implemented. A problem with such membranes is that under wet conditions, the interlayer spaces swell considerably due to water infiltration. For example, the membrane 200 interlayer spacing can swell from 0.77 nm under dry conditions to 1.2 nm under wet conditions. Some potential modification approaches therefore attempt to control the swelling by cross-linking, cation intercalation, or chemical reduction of the GO layer surfaces. Alternatively, or additionally, a chemical reduction approach (which leads to reduced GO membranes), can exhibit some enhancement in salt rejections compared to unmodified GO membranes.

Physical compaction by hydraulic pressure is another modification technique that can enhance the rejection and performance of GO membranes, but the hydrophilicity of the GO flakes can lead to a loss of membrane stability under flow conditions. Therefore, the combination of chemical reduction and physical compaction can lead to both a high chemical stability in BL as well as mechanical stability of the GO membranes.

Alternatively, or additionally, a unique type of microstructural control can be obtained by strong attachment of π-conjugated polycyclic cations to GO sheets, owing to π-π and electrostatic interactions with the GO sheets 210. This can limit interlayer swelling, and also create tunable steric barriers in the 2D interlayer galleries of GO flakes that can increase the path tortuosity as well as narrow the effective lateral spaces for hydrated ion and molecule transport.

An example of a GO membrane 200 altered by chemical reduction and/or physical compaction is illustrated by FIG. 2. Before forming the membrane 200, a base can be mixed into a GO suspension to interact with the GO and chemically modify the GO. For instance, the base can be an alkali material, such as inorganic bases (e.g., NaOH, KOH, LiOH, and the like) and/or organic bases (e.g., primary/secondary/tertiary amines, carboxylates, and the like). Without wishing to be bound by any scientific theory, the interaction of the GO suspension with the base can reduce the hydrophilic behavior of the subsequent GO sheets 210. Once the membrane 200 is formed, the membrane 200 can undergo a physical compaction. In some examples, the membrane 200 can undergo the chemical modification during the physical compaction, rather than chemically modifying the suspension. The physical compaction can be accomplished through any type of pressure applied to the membrane 200, such as hydraulic pressure, pneumatic pressure, and the like.

The physical compaction can allow for the subtle rearrangement of the GO sheets 210 in the membrane 200, which can be irreversible. This reduction in effective pore size of the GO membranes has previously been attributed to the narrowing of the "wrinkles" in the GO laminates after physical compaction, or the emergence of a more ordered GO laminate structure by rearrangement of dislocated GO flakes. Without wishing to be bound by any scientific theory, the physical compaction process does not directly decrease the interlayer spacing, since the GO layer thickness does not decrease during the process. Rather, it appears that more subtle effects such as migration and rearrangement of the GO flakes take place during the compaction process. Additionally, without wishing to be bound by any scientific theory, it is possible that the compaction process increases the adhesive forces between the GO layer and the porous support by other mechanisms.

The physical compaction can be an applied transmembrane pressure of 10 bar or greater (e.g., 20 bar or greater, 30 bar or greater, 40 bar or greater, 50 bar or greater, 60 bar or greater, 70 bar or greater, 80 bar or greater, 90 bar or greater, or 100 bar or greater). In some examples, the transmembrane pressure can be 100 bar or less (e.g., 90 bar or less, 80 bar or less, 70 bar or less, 60 bar or less, 50 bar or less, 40 bar or less, 30 bar or less, 20 bar or less, or 10 bar or less). In some examples, the transmembrane pressure can be from 10 bar to 100 bar (e.g., from 10 bar to 90 bar, from 10 bar to 80 bar, from 10 bar to 70 bar, from 10 bar to 60 bar, from 10 bar to 50 bar, from 10 bar to 40 bar, from 10 bar to 30 bar, from 10 bar to 20 bar, or from 50 bar to 100 bar).

Figure 6:
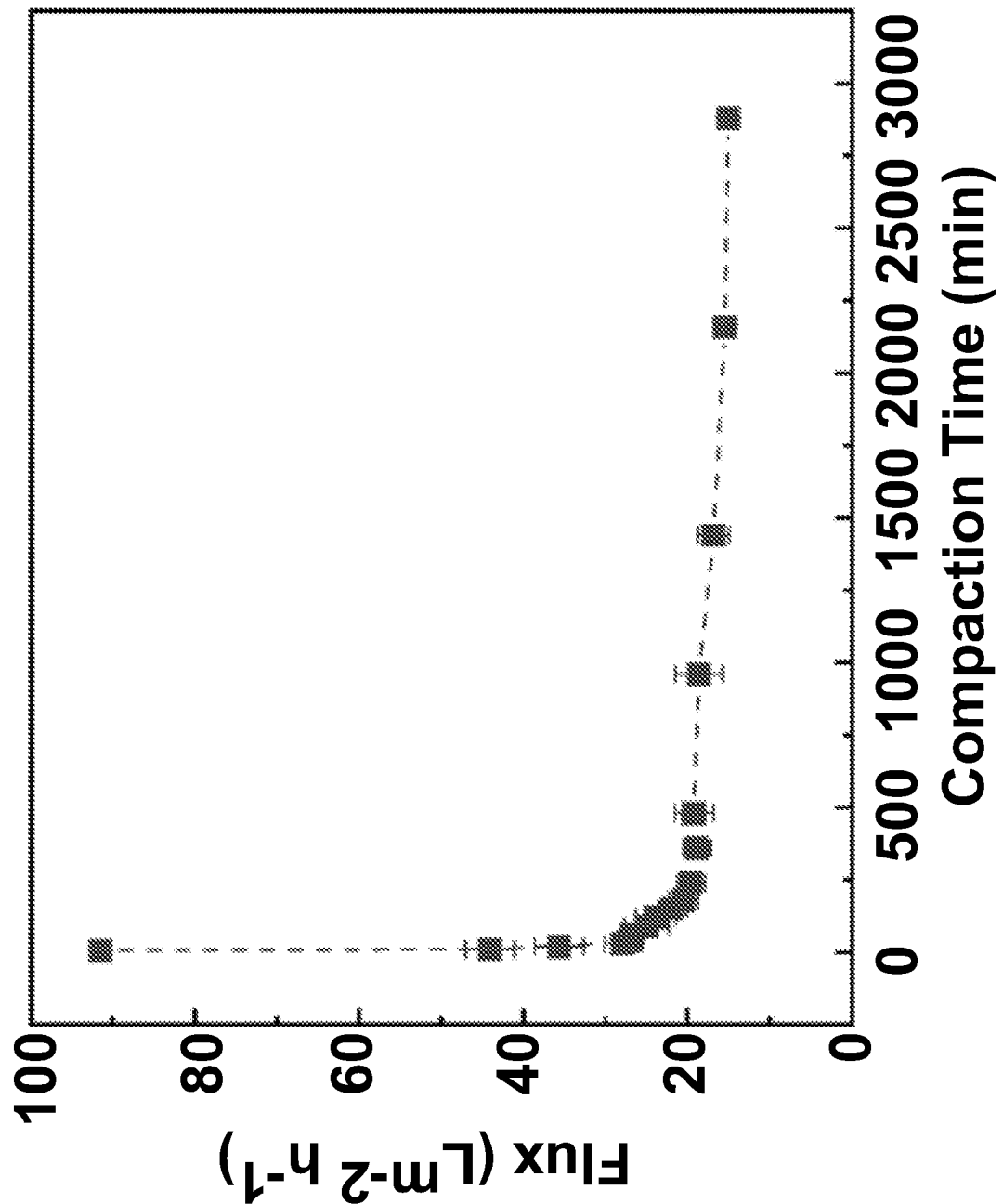
FIG. 6 illustrates a chart of the flux of a membrane undergoing physical compaction in accordance with some examples of the present disclosure.

The physical compaction can occur until the flux of the membrane 200 reaches a constant value, as shown in FIG. 6. For example, after physical compaction, an aqueous flux across the membrane 200 can change by 10% or less (e.g., 9% or less, 8% or less, 7% or less, 6% or less, 5% or less, 4% or less, 3% or less, 2% or less, or 1% or less). In some examples the aqueous flux across the membrane 200 can change by 1% or more (e.g., 2% or more, 3% or more, 4% or more, 5% or more, 6% or more, 7% or more, 8% or more, or 9% or more). In some examples, the aqueous flux across the membrane 200 can change from 1% to 10% (e.g., from 1% to 9%, from 1% to 8%, from 1% to 7%, from 1% to 6%, from 1% to 5%, from 1% to 4%, from 1% to 3%, or from 1% to 2%). The aqueous flux can be measured from 20° C. to 90° C.

The pressure can be applied for a sufficient amount of time for the membrane 200 to reach a substantially constant flux. For example, the transmembrane pressure can be applied from 1 hour to 72 hours (e.g., from 1 hour to 48 hours, from 1 hour to 36 hours, from 1 hour to 24 hours, from 1 hour to 12 hours, from 1 hour to 8 hours, or from 1 hour to 4 hours).

Figure 3A:
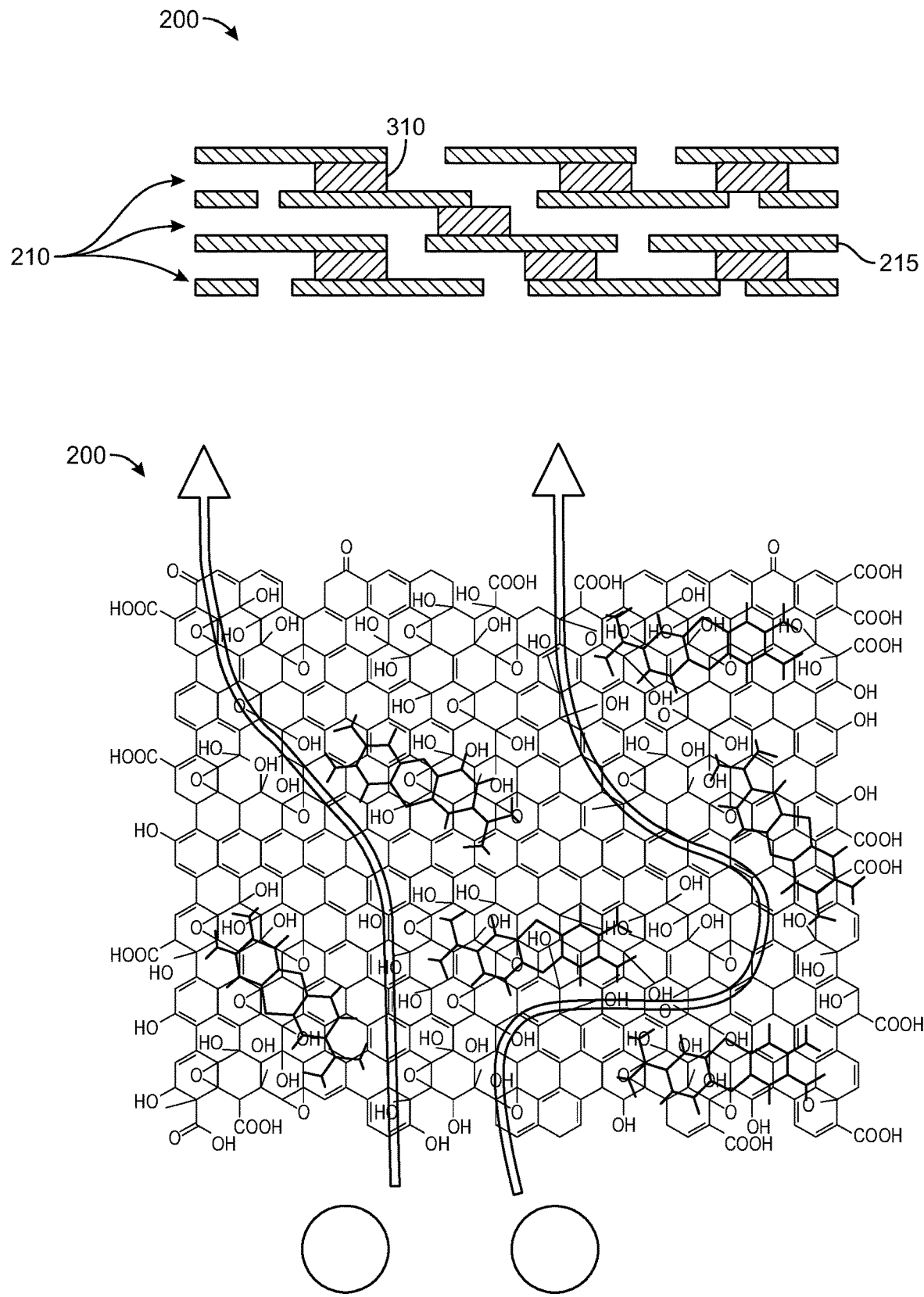
FIG. 3A illustrates a cross-sectional view of another membrane in accordance with some examples of the present disclosure.
Figure 3B:
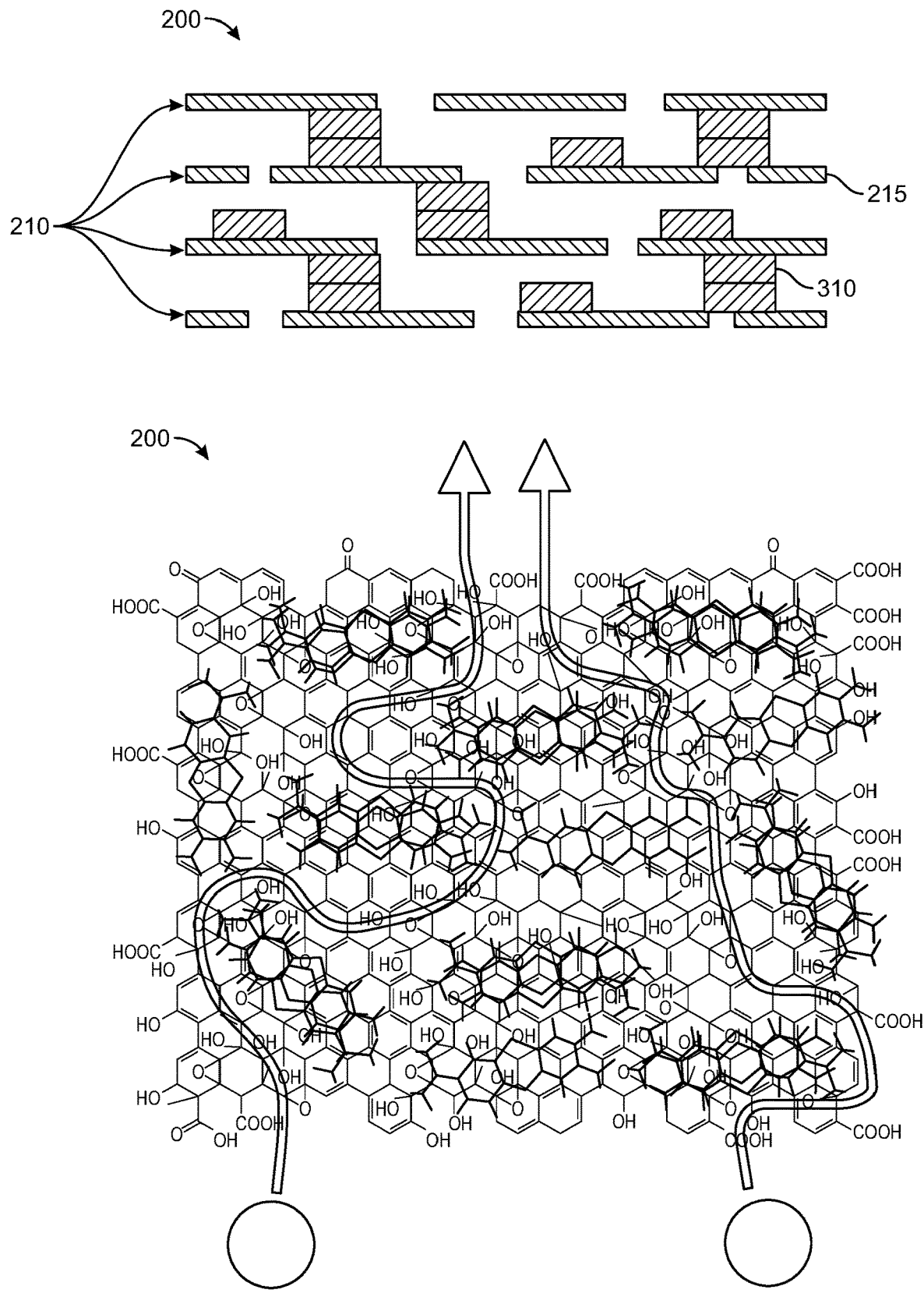
FIG. 3B illustrates a cross-sectional view of another membrane in accordance with some examples of the present disclosure.

Alternatively, or additionally, an intercalating agent 310 can be dispersed between the GO sheets 210, as shown in FIGS. 3A and 3B. The molecules of the intercalating agent 310 can interact with each other and with the GO sheets 210 through a variety of intermolecular forces, such as π-π interactions, electrostatic interactions, van der Waals forces, and the like. As will be appreciated, the intercalating agent 310 can provide for a non-covalent stabilization of the GO sheets 210. Alternatively, or additionally, without wishing to be bound by any scientific theory, the attractive π-π and coulombic interactions between TBO molecules and the GO sheets can effectively reduce the interlayer spacing between the GO sheets 210, thus preventing swelling. Thus, the π-intercalated GO membrane microstructures can create the possibility for control of solute transport both by vertical interlayer spacing variations as well as lateral transport path variations in the interlayer spaces. As would be appreciated, such modifications to the membrane 200 can ensure that the membrane 200 remains stable during constant use as well as increase the selectivity and rejection of the membrane 200.

The intercalating agent 310 can include a compound having π-conjugated polycyclic cations. This can refer to a molecule/material/ion with a network of pi-bonds that allow delocalization of pi-electrons which has more than one cyclic (closed ring) arrangement of atoms. For example, the intercalating agent 310 can comprise polycyclic dye toluidine blue O (TBO). The intercalating agent 310 can also be an uncharged polar or nonpolar compound. Alternatively, or additionally, the intercalating agent 310 can be a positively charged, negatively charged, or zwitterionically charged compound. The intercalating agent 310 can be selected based on specific parameters to structurally modify the GO sheets 210, such as size, polarity, and the like. There is a large available pool of π-conjugated molecules of varying size, shape, charge, and functionality that can be bound in the GO interlayer spaces. Therefore, the disclosed approach can open a broad range of fundamentally new possibilities for enhanced separation behavior relative to, for instance, recent suggestive studies on solute transport modulation using metal cations as intercalants (such as $K^+$ and $Al^{3+}$) for GO membranes and MXene membranes. However, it is understood that the intercalating agent 310 need not be so limited, and that the intercalating agent 310 can be any molecule or material that can lodge itself between the GO sheets 210.

Utilizing some or all of the aforementioned modifications to the membrane 200 can result in a membrane with high performance that is stable under the harsh operating conditions of a black liquor feedstock. For instance, the membrane 200 can remain stable under 60° C. temperatures or greater, and/or the membrane 200 can remain stable under a pH of 8 or greater. As would be appreciated, a stable membrane can have a flux value that changes by 10% or less (e.g., 9% or less, 8% or less, 7% or less, 6% or less, 5% or less, 4% or less, 3% or less, 2% or less, or 1% or less) during the operation under harsh conditions.

The intercalating agent 310 can be present in the membrane 200 in an intercalating agent-to-GO ratio from 1:1 to 1:20 (e.g., from 1:1 to 1:15, from 1:1 to 1:10, from 1:1 to 1:8, from 1:1 to 1:6, from 1:1 to 1:5, from 1:1 to 1:4, from 1:1 to 1:3, or from 1:1 to 1:2). The specific amount of intercalating agent 310 can be altered or tuned based on the desired functional properties of the membrane 200.

When being fed a black liquor feedstock (such as in the system 100), the membrane 200 can exhibit specific rejection of solids and a high flux of water permeating through the membrane 200. While the following performances are described with respect to using the membrane 200 in the described system 100, it is understood that the membrane 200 can exhibit similar performance when used in other systems. The following performances are described in an example system 100 operating with 15% solids by weight black liquor feed stock under 10 bar to 50 bar of transmembrane pressure.

In some examples, the membrane 200 can have a lignin rejection of 50% or greater (e.g., 51% or greater, 52% or greater, 53% or greater, 54% or greater, 55% or greater, 56% or greater, 57% or greater, 58% or greater, 59% or greater, 60% or greater, 61% or greater, 62% or greater, 63% or greater, 64% or greater, 65% or greater, 66% or greater, 67% or greater, 68% or greater, 69% or greater, 70% or greater, 71% or greater, 72% or greater, 73% or greater, 74% or greater, 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, 95% or greater, 96% or greater, 97% or greater, 98% or greater, or 99% or greater). In other words, 50% or more of the lignin present in the feedstock (e.g., in the feed line 120) can be rejected by the membrane 200 and can flow out in the retentate (e.g., in the retentate line 140). An example of the lignin rejection for a membrane of the present disclosure can be found in FIG. 7A.

In some examples, the membrane 200 can have a total organic carbon rejection of 50% or greater (e.g., 51% or greater, 52% or greater, 53% or greater, 54% or greater, 55% or greater, 56% or greater, 57% or greater, 58% or greater, 59% or greater, 60% or greater, 61% or greater, 62% or greater, 63% or greater, 64% or greater, 65% or greater, 66% or greater, 67% or greater, 68% or greater, 69% or greater, 70% or greater, 71% or greater, 72% or greater, 73% or greater, 74% or greater, 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, 95% or greater, 96% or greater, 97% or greater, 98% or greater, or 99% or greater). In other words, 50% or more of the total organic carbon present in the feedstock (e.g., in the feed line 120) can be rejected by the membrane 200 and can flow out in the retentate (e.g., in the retentate line 140). An example of the total organic carbon rejection for a membrane of the present disclosure can be found in FIG. 7B. As used herein, the term total organic carbon (TOC) can refer to the total carbon content in the feed arising from organic components, and the TOC rejection is the % of that TOC which is retained/rejected by the membrane without being passed in the permeate.

In some examples, the membrane 200 can have a total solids rejection of 50% or greater (e.g., 51% or greater, 52% or greater, 53% or greater, 54% or greater, 55% or greater, 56% or greater, 57% or greater, 58% or greater, 59% or greater, 60% or greater, 61% or greater, 62% or greater, 63% or greater, 64% or greater, 65% or greater, 66% or greater, 67% or greater, 68% or greater, 69% or greater, 70% or greater, 71% or greater, 72% or greater, 73% or greater, 74% or greater, 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, 95% or greater, 96% or greater, 97% or greater, 98% or greater, or 99% or greater). In other words, 50% or more of the total solids present in the feedstock (e.g., in the feed line 120) can be rejected by the membrane 200 and can flow out in the retentate (e.g., in the retentate line 140). An example of the total solids rejection for a membrane of the present disclosure can be found in FIG. 7C. As used herein, the term total solids (TS) can refer to the total of all dissolved or suspended components in the water, and its rejection defined similarly as above with respect to total organic carbon.

As described above, tuning/altering the membrane 200 can lead to changes in the thickness of the interlayer spaces, thus changing the flux of the membrane 200. However, the stability of the disclosed membranes can provide for a stable flux under a variety of operating conditions such that the flux changes by 10% or less (e.g., 9% or less, 8% or less, 7% or less, 6% or less, 5% or less, 4% or less, 3% or less, 2% or less, or 1% or less) during operation.

While the following methods are described in relation to the membrane 200 and/or the system 100, it is understood that some or all steps of the method can be performed by other systems not disclosed herein, or that some or all steps of the method can be used to create other membranes similar to those described herein.

Figure 4:
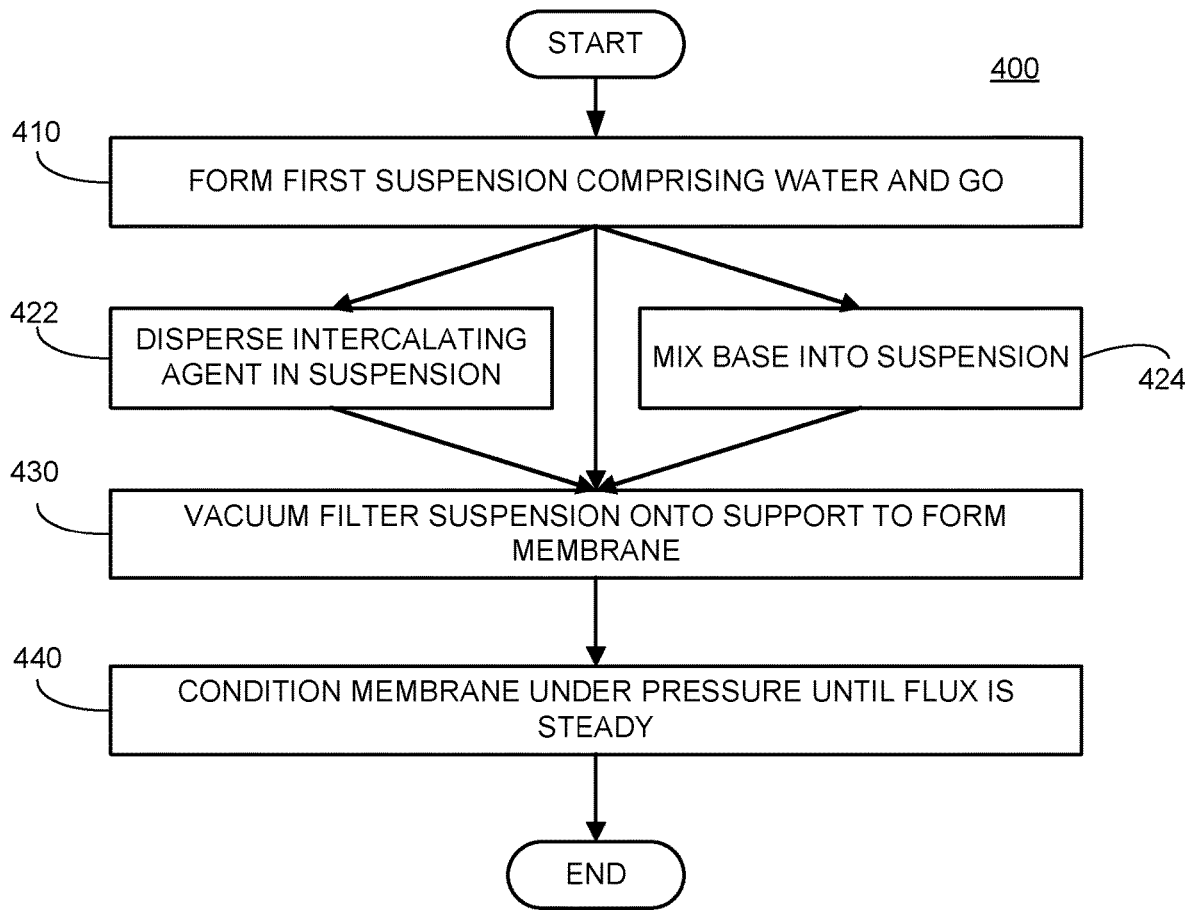
FIG. 4 illustrates a flowchart of a method of making a membrane in accordance with some examples of the present disclosure.

FIG. 4 illustrates a flowchart of an example method 400 for making the disclosed membranes. As shown in block 410, water can be mixed with graphene oxide (GO) to form a first suspension. In some examples, forming the first suspension can include forming a GO paste, centrifuging the GO paste to form a first bottom solids component, washing the first bottom solids component, centrifuging the first bottom solids component to form a second bottom solids component, washing the second bottom solids component to form a GO material, and suspending the GO material in water to form the suspension. The method 400 can then proceed on to any of blocks 422, 424, or 430, or on to a combination of some or all of blocks 422, 424, and/or 430.

In block 422, an intercalating agent can be dispersed in the first suspension. The intercalating agent can be selected to modify the structure of the resulting membrane, and the intercalating agent can be configured to interact with the GO molecules through one or more of π-π or electrostatic interactions. Various examples of an intercalating agent are described above, though any desired intercalating agent can be used so long as the intercalating molecules can interact with the GO molecules to prevent swelling. The method 400 can then proceed on to any of blocks 424 and/or 430.

In block 424, a base can be mixed into the first suspension. For instance, the base can be an alkali material. Without wishing to be bound by any scientific theory, the interaction of the GO molecules with the base can reduce the hydrophilic behavior of the subsequent GO sheets 210. The method 400 can then proceed on to any of blocks 422 and/or 430.

In block 430, the suspension can be vacuum filtered onto a porous support to form a membrane. The membrane can be cast in a variety of shapes, such as fibers, thin films, and the like. The porous support can include a polymeric support, such as poly(sulfone) and poly(ethersulfone). The porous support can also include polymeric, ceramic (e.g., alumina and other metal oxides, carbides, nitrides), carbon, and/or metallic (such as porous stainless steel) supports. In some examples, the method 400 can terminate after block 430. However, in other examples, the method 400 can then proceed on to block 440.

In block 440, the membrane can be conditioned under a pressure (such as hydraulic or pneumatic). This physical compaction can allow for the subtle rearrangement of the GO sheets 210 in the membrane 200, which can be irreversible. This reduction in effective pore size of the GO membranes has previously been attributed to the narrowing of the "wrinkles" in the GO laminates after physical compaction, or the emergence of a more ordered GO laminate structure by rearrangement of dislocated GO flakes. The method 400 can then terminate or proceed on to other method steps not shown.

Figure 5:
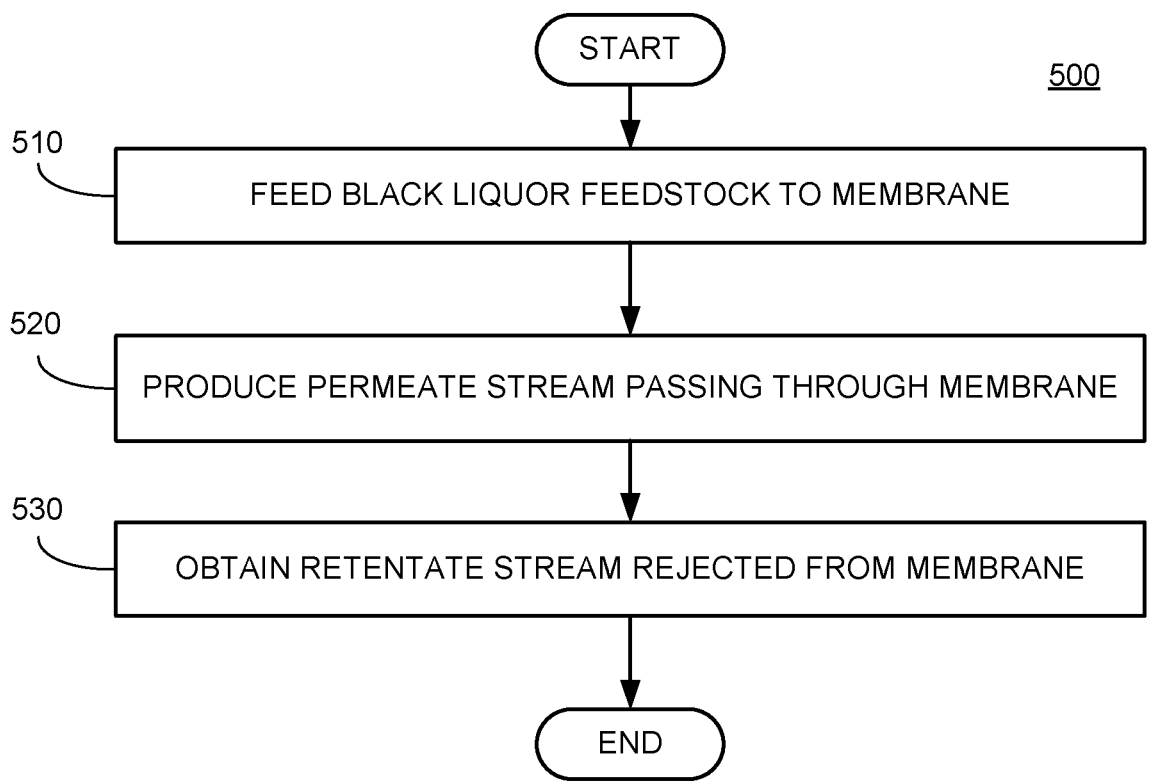
FIG. 5 illustrates a flowchart of a method of purifying water from liquor streams in accordance with some examples of the present disclosure.

FIG. 5 illustrates a flowchart of an example method 500 for purifying black liquor using the membranes and/or systems described herein. As shown in block 510, a feedstock of black liquor can be fed to the membranes of the present disclosure. The membrane can operate from 10 bar to 50 bar of transmembrane pressure, and the lack liquor feedstock can comprise from 1% to 50% solids by weight based on the total weight of the feedstock. The method 500 can then proceed to block 520.

In block 520, a permeate stream can be produced from one or more purified products that have passed through the membrane. For instance, the permeate stream can comprise water that is able to pass through the membrane. The permeate stream can have a flow rate relative to the flow rate of the feedstock. In other words, the membrane can have a stage cut anywhere between 1% and 99%. The method 500 can then proceed to block 530.

In block 530, a retentate stream can be obtained. The retentate stream can include one or more rejected components that have not passed through the membrane, such as lignin, salts, organic carbon, and the like. The method 500 can then terminate after block 530 or proceed on to other method steps not shown.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLES

The following exemplary use cases describe examples of a typical user flow pattern. They are intended solely for explanatory purposes and not limitation.

Synthetic grade graphite powder (lateral size <20 micron), hydrochloric acid (HCl), concentrated sulfuric acid (98% $H_2SO_4$), sodium hydroxide pallets (NaOH), potassium persulfate ($K_2S_2O_8$), phosphorus pentoxide ($P_2O_5$), potassium permanganate ($KMnO_4$), glucose ($C_6H_{12}O_6$), phenol ($C_6H_5OH$), toluidine blue O ($C_{15}H_{16}N_3S^+Cl^-$), and ethanol ($C_2H_5OH$) can be purchased from Sigma-Aldrich (Milwaukee, MI, USA) and used as received. Deionized (DI) water can be produced by a Thermo Scientific 7128 RO system (Waltham, MA, USA). PES ultrafiltration membrane supports with 0.03 micron pores can be obtained from Sterlitech Corporation (Kent, WA, USA). Raw kraft black liquor (BL) can be obtained from an International Paper mill in Rome, GA, USA and used as received.

For chemically modified GO suspension synthesis, 0.25 g NaOH can be added to 100 mL of a 1 g/L GO suspension, and the mixture can be stirred for 30 minutes vigorously and heated to reflux at 100° C. in a flask for 2 h, followed by 30 min ultrasonication to give a stable modified GO suspension. The concentration of GO in the suspension can be approximately 1 g/L. Prior to permeation measurements with BL, the as-made GO membranes can be conditioned in DI water under 50 bar trans-membrane pressure (TMP) in a dead-ended stirred permeation cell (Sterlitech), until a relatively steady state (flux change less than 5% per hour) is reached (typically within 48 h). This conditioning process produces the physically compacted GO membranes.

To fabricate a base membrane, graphene oxide dispersions (1.00 mg/mL) can be prepared following a modified Hummers method. 1 mL graphene oxide dispersion can be dispersed into 450 mL volume of DI water and vigorously stirred for at least 1 min, followed by 5 min ultrasonication. Then 50 mg TBO can be dissolved into 100 mL DI water to prepare a 0.5 g/L TBO dispersion. Various small volumes (0.10 mL, 0.20 mL, 0.50 mL, 1.00 mL and 2.00 mL) of the dispersion can be added to 50 mL volumes of DI water and vigorously stirred for 1 min. These solutions can then be added into the original dispersions under vigorous stirring to obtain GO-TBO dispersions with the following GO/TBO mass ratios: 20:1, 10:1, 4:1, 2:1 and 1:1. These GO-TBO dispersions can be vacuum-filtered through 30 nm pore size PES supports (9 cm diameter) at a vacuum pressure of −40 kPa (−300 mmHg) using a Buchner funnel setup, to obtain GO-TBO membranes. During the vacuum filtration process, a stainless-steel cover can be placed on the top to prevent any background airflow disturbances. After filtration is completed, the cover can be removed but the vacuum was still applied to the GO-TBO membranes for at least 3 hours. Then the membranes can be removed and dried at room temperature for at least 24 hours before further characterization and permeation measurements.

Modified GO (GO) dispersions (1.00 mg/mL) can be prepared as described above. In a typical membrane sheet synthesis, 13.9 mL GO can be diluted into 450 mL DI water and vigorously stirred for at least 5 min, followed by 10 min ultrasonication, to obtain a ~30 mg/L GO suspension. Various small volumes (1.39 mL, 2.78 mL, 6.95 mL, 13.90 mL and 27.80 mL) of the suspension were added to 100 mL volumes of DI water and vigorously stirred for 5 min. These solutions can then be added into the TBO dispersions under vigorous stirring to obtain GO-TBO dispersions with the following GO/TBO mass ratios: 20:1, 10:1, 4:1, 2:1 and 1:1. These GO-TBO dispersions can be vacuum-filtered through 30 nm pore size PES supports (29.3 cm diameter) at a vacuum pressure of −40 kPa (−300 mmHg) using a 293 mm stainless steel filter holder, to obtain GO-TBO membranes sheets. After filtration is completed, the vacuum can still be applied to the GO-TBO membranes for at least 12 hours. Then the membranes can be removed and dried at room temperature for at least 24 hours before further characterization and permeation measurements.

To understand the GO membrane behavior during its conversion and conditioning by hydraulic compaction at a transmembrane pressure of 50 bar, the aqueous flux across the membrane can be tracked over time as shown in FIG. 6. As shown, the membrane showed a significant flux decline during the first 2 h, and a much slower decrease in the flux from 2 h to 48 h. Without wishing to be bound by any scientific theory, the initial rapid flux decline can be caused by the fast compaction of the PES support layer (leading to a reduction in its effective pore size and porosity), whereas the subsequent long period of compaction allows for more subtle rearrangement of the GO sheets under hydraulic pressure. To examine the reversibility of this process, the aqueous flux measurement after a 48-h period of pressure relaxation to ambient (1 bar) conditions was found to be similar before and after the 48 h relaxation, strongly indicating that the compaction is irreversible. The irreversibility of the physical compaction under ordinary pressure conditions allows the use of this method for reducing the effective interlayer spacing of the GO membranes.

After conditioning a GO membrane under hydraulic pressure of 50 bar for 2 h, it can exhibit much better stability but can still show minor delamination. The GO membrane after pressure conditioning/compaction can show superior stability with no observable delamination, which could be clearly attributed to the stronger adhesion between the PES support and the GO membrane layer, without wishing to be bound by any particular scientific theory. Therefore, the combination of chemical reduction and physical compaction can greatly enhance the stability of the GO membrane in BL under high rotational flux. The GO membrane obtained after 48 h compaction also showed excellent stability in BL. This stability under shear conditions is a significant result, since higher feed crossflow rates are desirable for mitigation of concentration polarization and possible fouling effects during operation with high-solids feed streams.

Figure 7A:
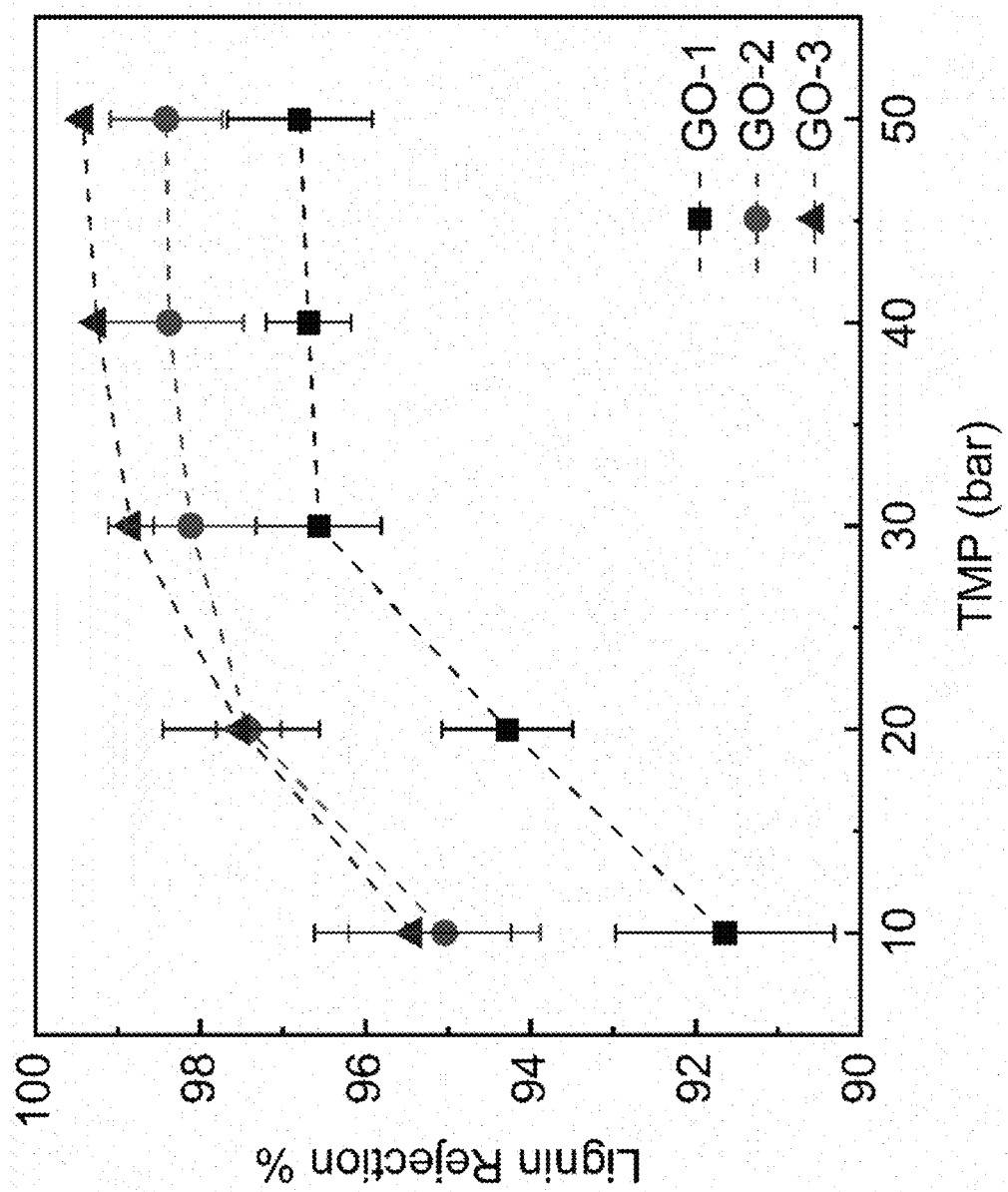
FIG. 7A is a chart of the lignin rejection of a membrane in accordance with some examples of the present disclosure.
Figure 7B:
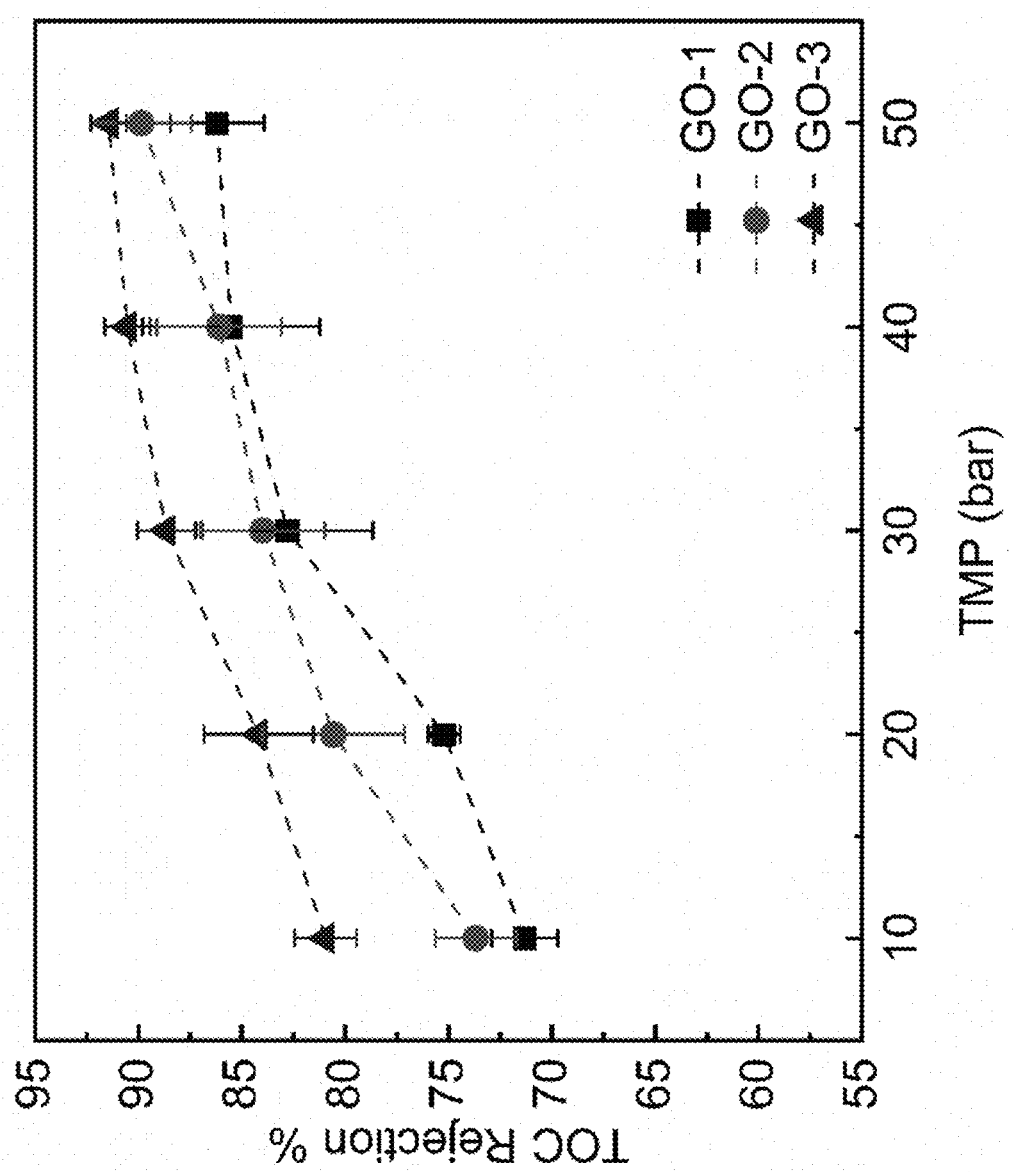
FIG. 7B is a chart of the total organic carbon rejection of a membrane in accordance with some examples of the present disclosure.
Figure 7C:
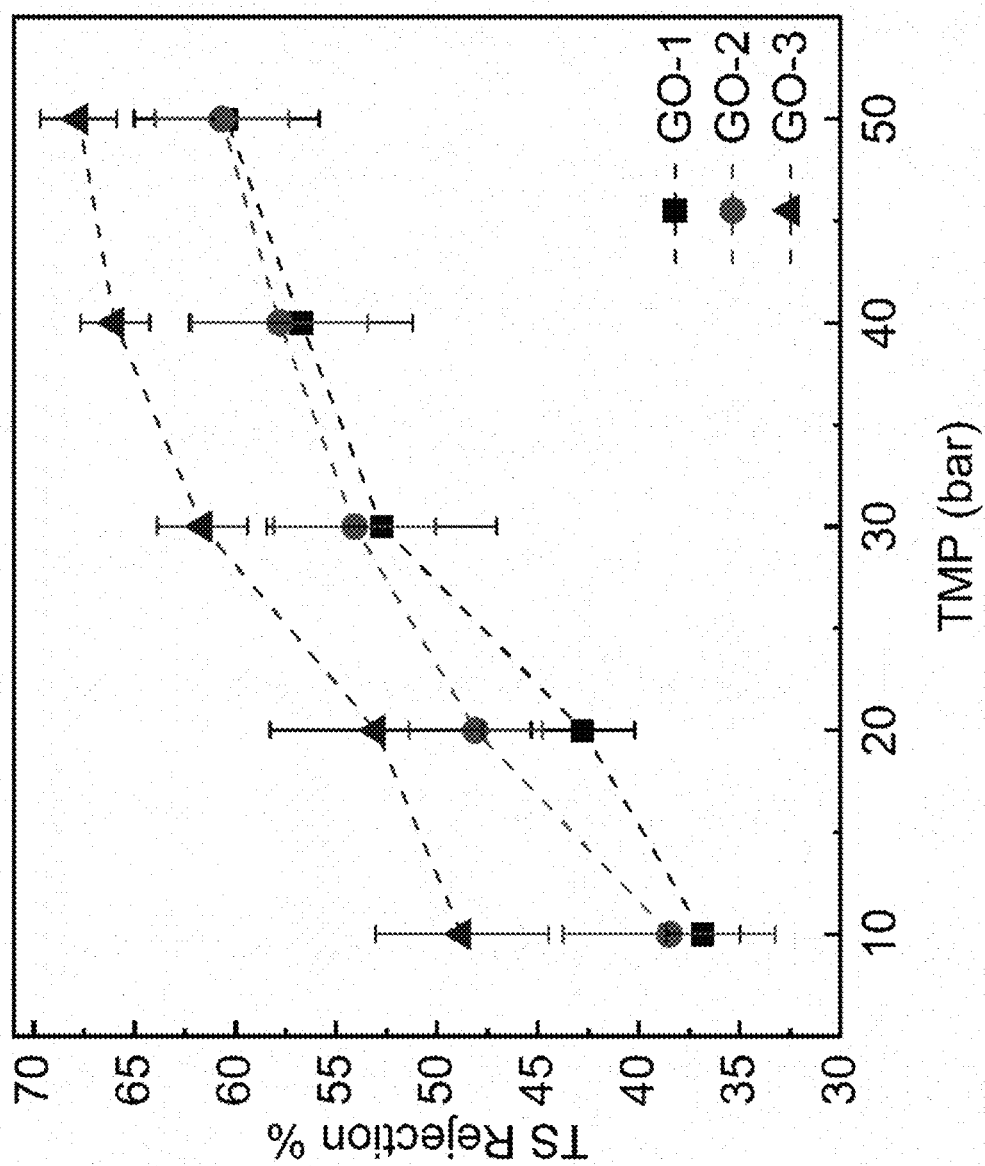
FIG. 7C is a chart of the total solids rejection of a membrane in accordance with some examples of the present disclosure.
Figure 8A:
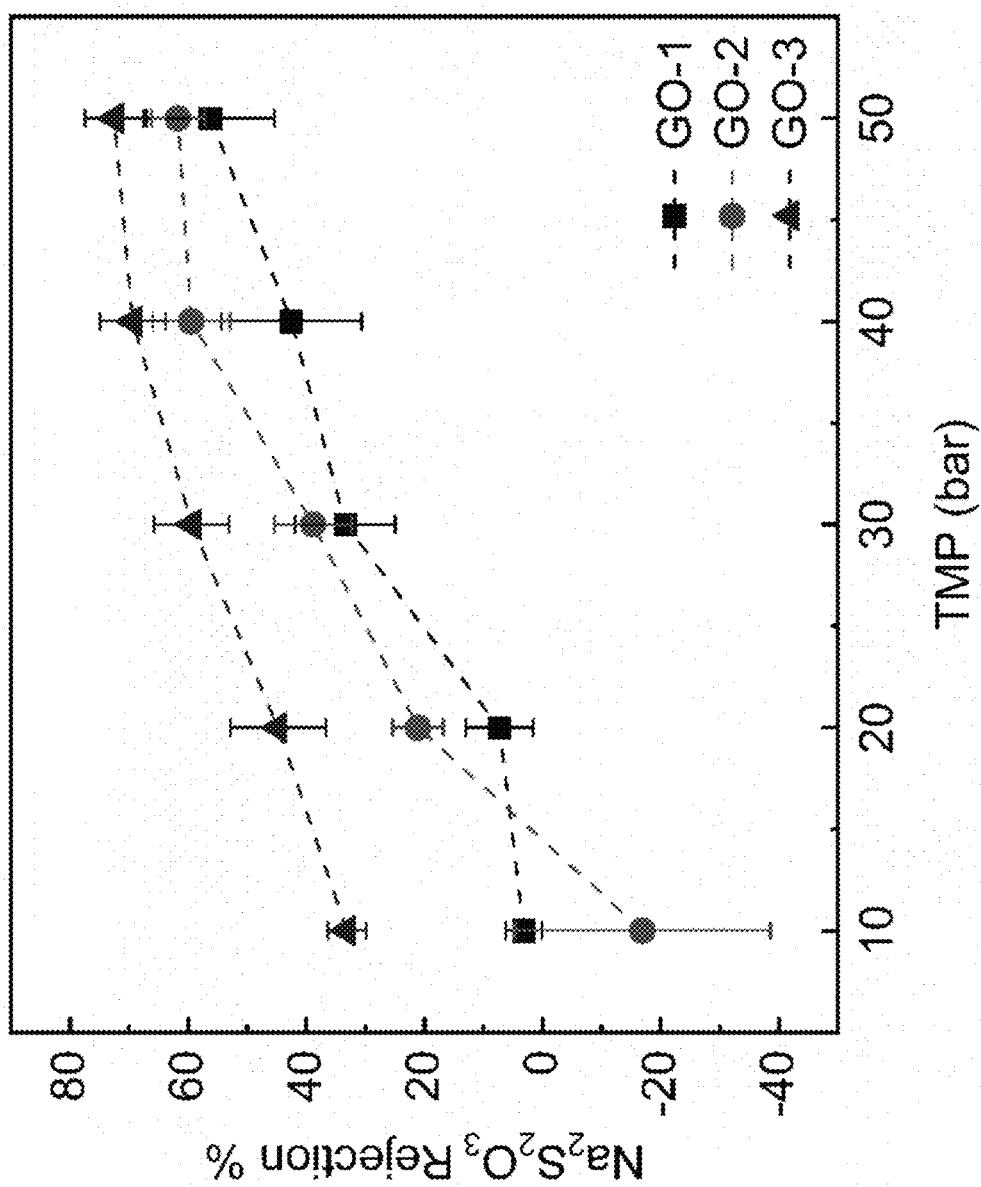
FIGS. 8A-D are charts of the rejections of various salts by a membrane in accordance with some examples of the present disclosure.
Figure 8B:
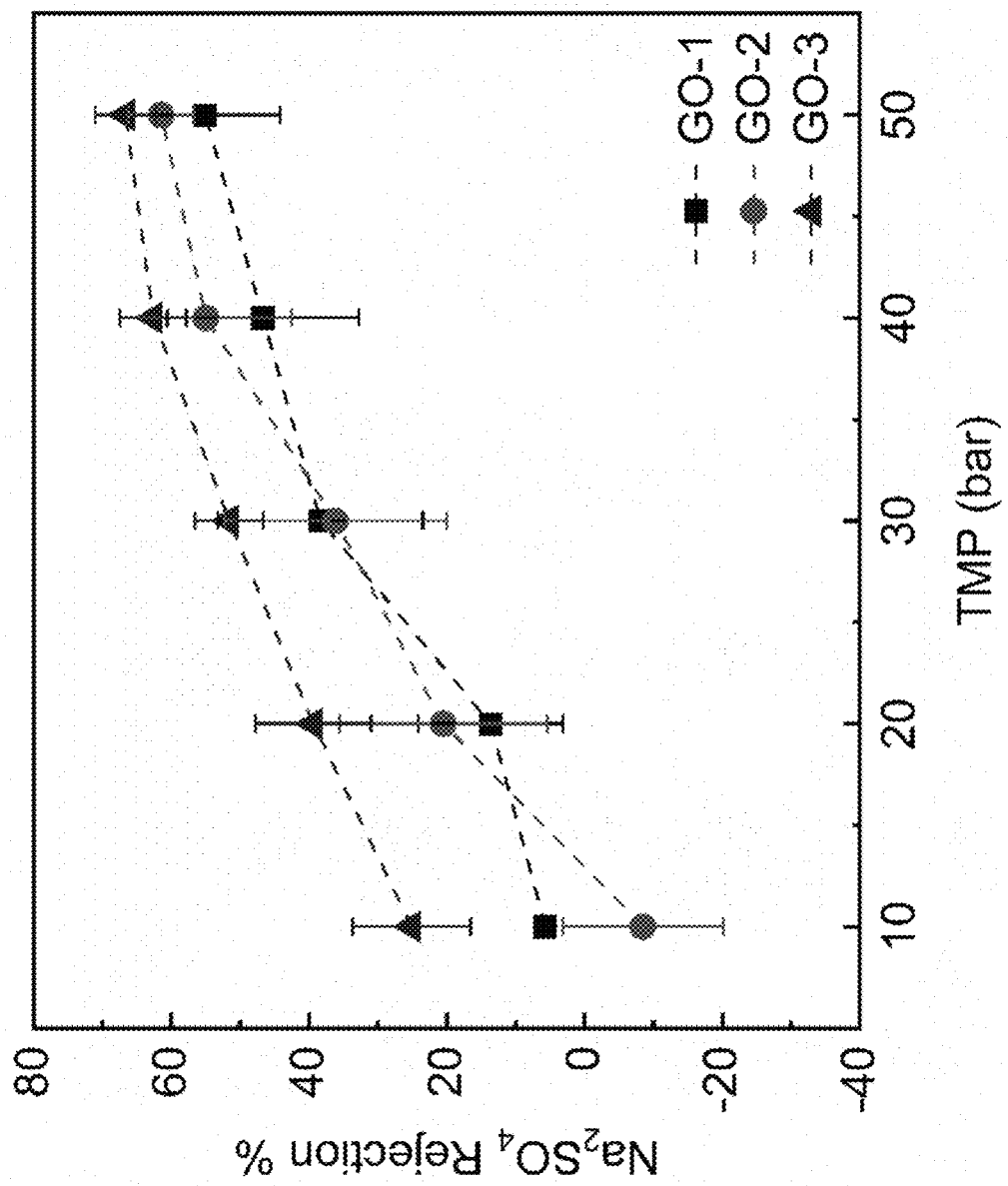
Figure 8C:
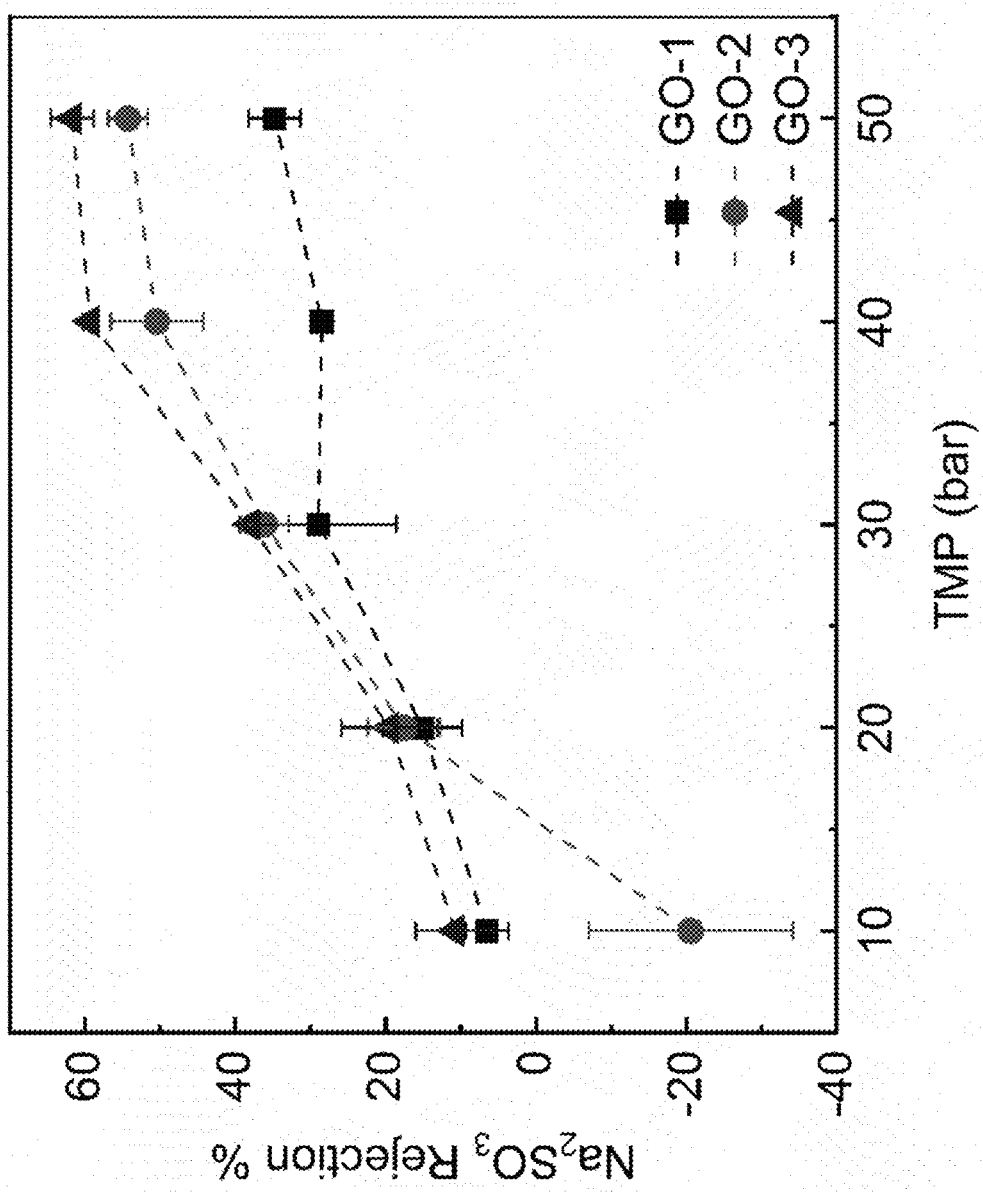
Figure 8D:
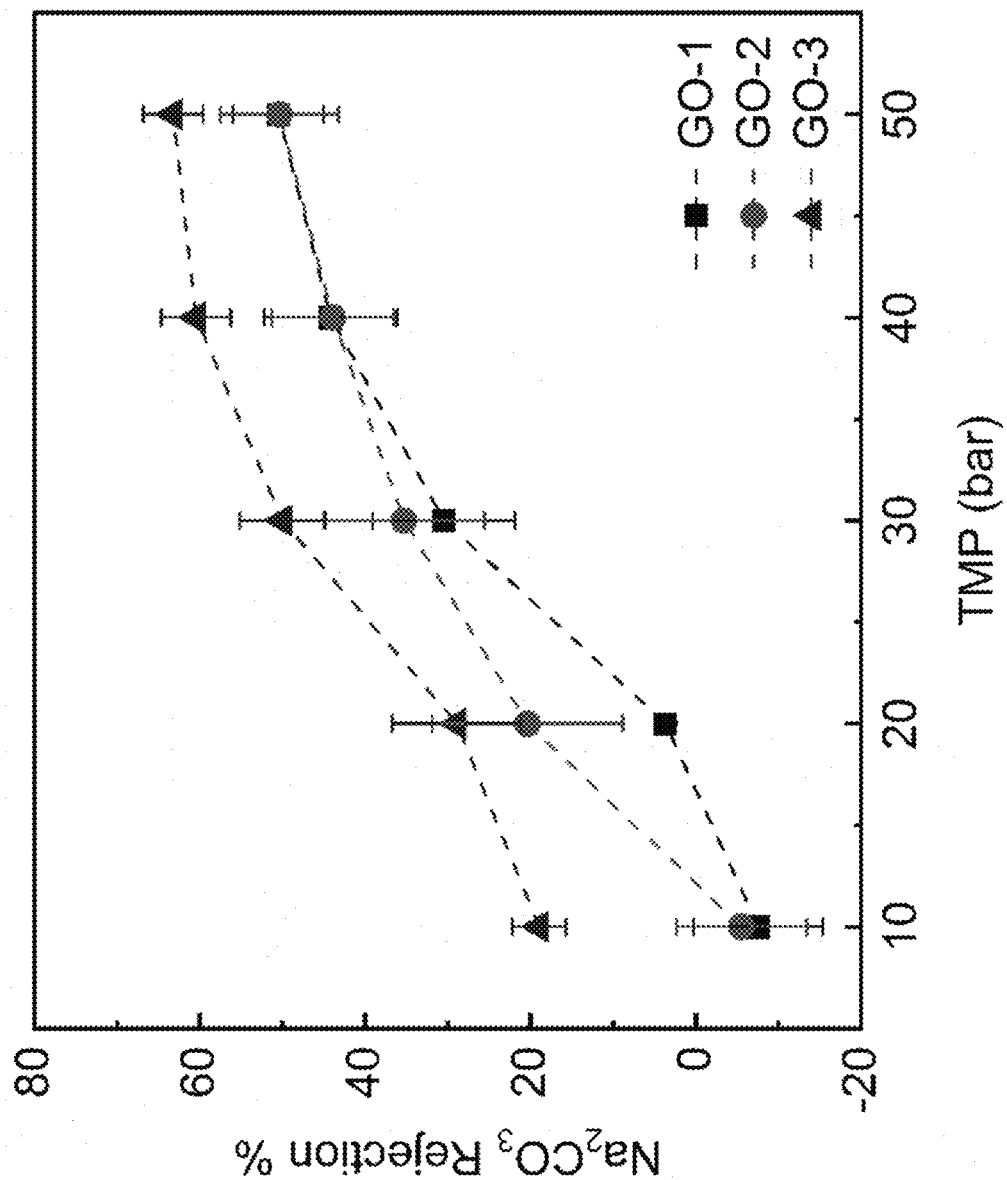

FIGS. 7A-C summarize the rejection performance of the three types of GO coupon membranes: total solids (TS), lignin, and total organic carbon (TOC). Additionally, the rejections of five individual salts present in BL. As shown, this behavior is consistent with that of the pure water flux, as the compaction of the GO membrane improved the selectivity towards smaller molecules and ions. This reduction in effective pore size of the GO membranes has previously been attributed to the narrowing of the "wrinkles" in the GO laminates after physical compaction, or the emergence of a more ordered GO laminate structure by rearrangement of dislocated GO flakes. The total solids rejection of all the three kinds of GO membranes improved with increasing transmembrane pressure. Additionally, the GO membrane reaches an excellent lignin rejection of ~99.5% at around 50 bar of transmembrane pressure.

In the kraft process cycle, the sulfur-containing divalent salts ($Na_2S_2O_3$, $Na_2SO_4$, and $Na_2SO_3$) are reduced to $Na_2S$ in the recovery boiler. The $Na_2S$ as well as $Na_2CO_3$ are be re-dissolved and sent to the lime kiln to regenerate NaOH. The resulting $Na_2S$—NaOH solution is referred to as "white liquor" (WL) which is used to treat wood chips at the beginning of the kraft cycle. In the membrane-based dewatering of 15 wt % BL, these salt species should also be rejected as much as possible in the NF stage so that they proceed to the recovery boiler along with lignin. The disclosed GO membranes can remove a substantial portion of these divalent salts at 30 to 50 bar transmembrane pressure, as shown in FIGS. 8A-D. At 50 bar, the rejections are generally in the order $Na_2S_2O_3 > Na_2SO_4 > Na_2SO_3$. This reflects the mechanism of ion rejection by size, as the hydrated ion diameters also follow the same sequence: $S_2O_3^{2-}$ (0.776 nm) $> SO_4^{2-}$ (0.760 nm) $> SO_3^{2-}$ (0.736 nm). The divalent carbonate salt ($Na_2CO_3$) also has comparable rejection to the divalent sulfated salts. In addition to 99.5% lignin rejection and >90% TOC rejection, the GO membrane can reject about 73% $Na_2S_2O_3$, about 67% $Na_2SO_4$, about 62% $Na_2SO_3$, and about 63% $Na_2CO_3$ at higher temperatures of 70° C. with real BL feeds. The other divalent salt in BL is $Na_2S$, present in equilibrium with monovalent NaHS.

Figure 9A:
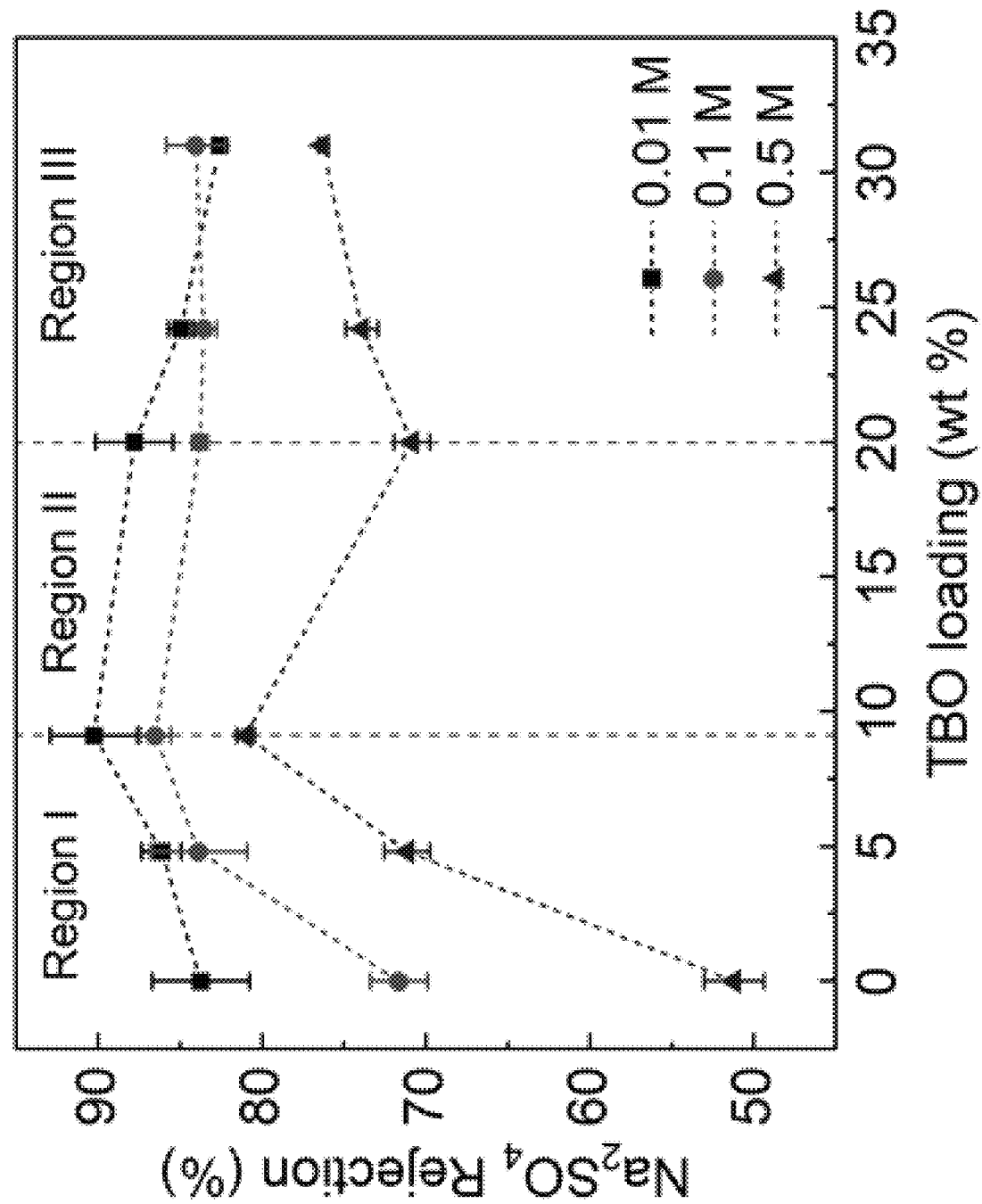
FIGS. 9A-C are charts of the rejections of various salts and molecules by a membrane in accordance with some examples of the present disclosure.
Figure 9B:
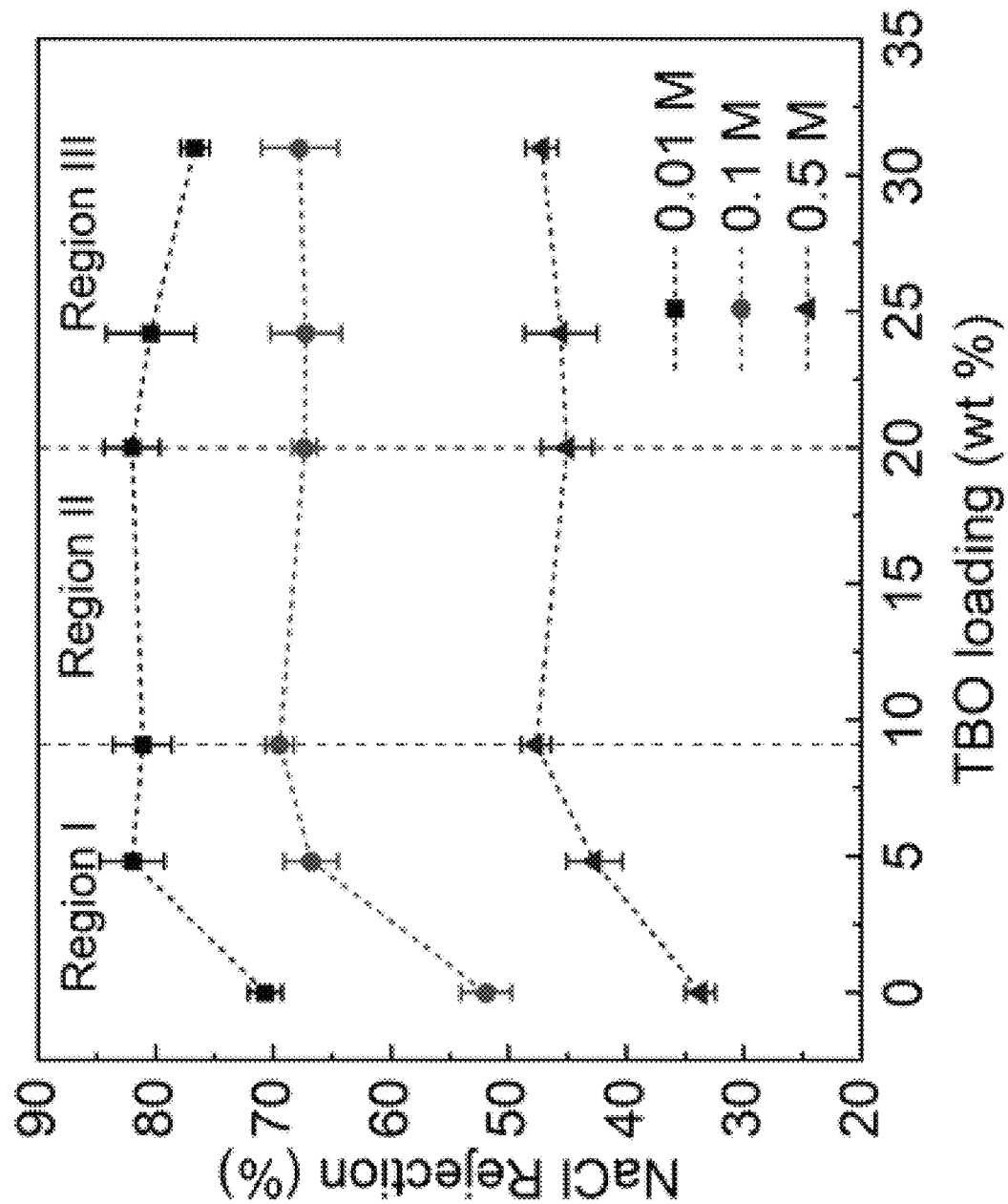
Figure 9C:
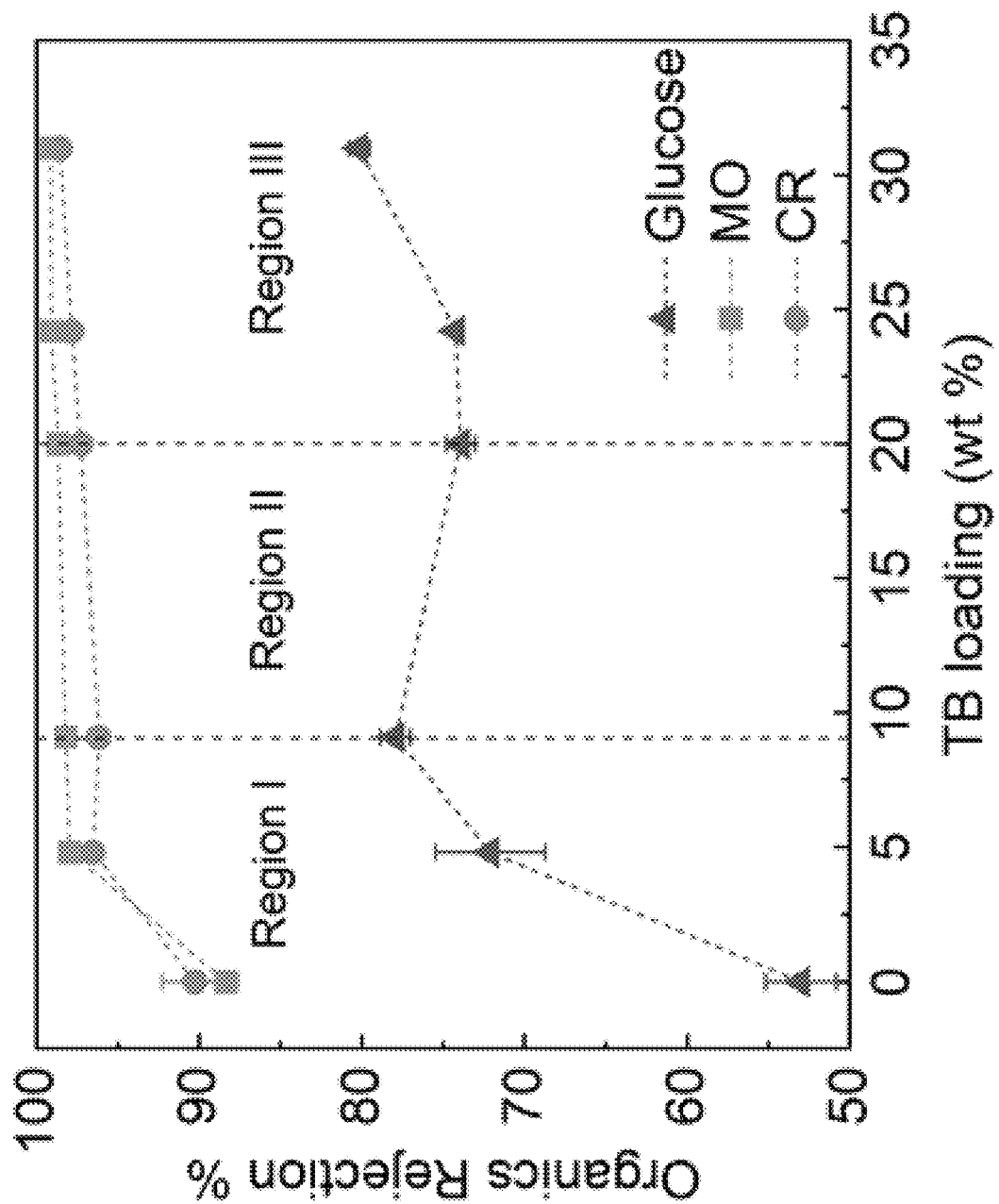

The present GO-TBO membranes (e.g., containing 9.1 wt % TBO) show much higher salt rejections sustained over a remarkably wide concentration range measured up to 0.5 M. FIGS. 9A-C show the solute rejection behavior of salts ($Na_2SO_4$ and NaCl), large organic anions (methyl orange and cresol red), and neutral molecules (glucose) in GO-TBO membranes as a function of TBO content and salt concentration.

The TBO loading dependence shows interesting trends in three regions labeled in FIGS. 9A-C (I: predominantly monomer TBO intercalation, III: predominantly dimers, and II: transitional region between I and III). In region I, TBO intercalation dramatically improves all salt, organic anion, and molecular rejections in relation to pure GO membranes, including at high solute concentrations.

Interlayer d-spacing under wet conditions significantly decreases in Region I because of GO-TBO binding, which appears to be a major cause of the rejection increase. Additional sieving effects, caused by creation of a steric barrier for solute permeation in the 2D interlayer spaces due to TBO intercalation, may also begin to operate. In Region II the rejections either do not increase further, or decrease moderately, with additional TBO loading. The decrease in rejection is more pronounced at higher salt concentrations and for the larger divalent sulfate ion (hydrated diameter 0.76 nm) than the monovalent chloride ion (0.66 nm).

In Region III the high rejections are maintained at low salt concentrations and are recovered at higher salt concentrations. Without wishing to be bound by any one scientific theory, this unusual behavior in Regions II and III can be explained by two counteracting effects: the d-spacing actually expands in Region II due to the formation of TBO H-dimers (thus reducing the rejection), but at the same time the lateral sieving effects such as window-narrowing and tortuosity are expected to increase with TBO loading in both Regions II and III (thus increasing the rejection). The permeate fluxes from salt solutions show the same behavior as under pure water, with the fluxes having significant decreases (relative to GO membranes) at lower TBO loadings and remaining nearly constant thereafter.

Further evidence for the above mechanism is provided in FIG. 9C. The neutral molecule glucose (MW 180) also shows the same rejection behavior as a function of TBO loading, confirming the counteracting roles of interlayer d-spacing changes and steric effects (that are both caused by TBO intercalation) in controlling the effective diffusivity of solutes in the membranes. As the solute sizes increase, e.g., methyl orange (MO) (MW 327) and cresol red (CR) (MW 404), the rejection behavior displays essentially a monotonic behavior as a function of TBO loading. The high rejections (95-99%) of these solutes also confirm that the membranes are free of significant mesoscopic defects.

What is claimed is:

1. A method comprising:
   forming a first suspension comprising water and two or more graphene oxide (GO) sheets;
   mixing a base into the first suspension to form a second suspension;
   dispersing an intercalating agent including a compound having π-conjugated polycyclic cations in the second suspension;
   vacuum filtering the second suspension onto a porous membrane support to form a GO sheet layered membrane, the layers vertically separated one from another by interlayer spacing; and
   conditioning the membrane under a transmembrane pressure of 10 bar or greater until an aqueous flux of the membrane changes by 5% or less;
   wherein molecules of the method assembles a selective separation structure for the membrane providing dual directional transport modulation, in a vertical direction by the intercalating agent controlling interlayer swelling by interaction of molecules of the intercalating agent with one another and with the GO sheets through one or more of: π-π or electrostatic interaction; and in a lateral direction by creating tunable steric barriers in the layers that increase path tortuosity as well as narrow effective lateral spaces for transport.

2. The method of claim 1 further comprising:
   tuning solute rejection of the membrane within a region of intercalation selected from a group consisting of a region of predominantly monomer intercalating agent intercalation and a region of predominantly dimer intercalating agent intercalation;
   wherein:
      the conditioning comprises applying the transmembrane pressure via hydraulics or pneumatics; and
      the intercalating agent has a mass ratio compared to GO of from 1:1 to 1:20.

3. The method of claim 1 further comprising:
   tuning solute rejection of the membrane within a region of intercalation selected from a group consisting of a region of predominantly monomer intercalating agent intercalation and a region of predominantly dimer intercalating agent intercalation;
   wherein at least one of:
      the GO has a concentration in the first suspension from 1 g/L to 50 g/L; or
      the GO has a concentration in the second suspension from 1 g/L to 50 g/L.

4. The method of claim 3, wherein the forming the first suspension comprises:
   forming a GO paste;
   centrifuging the GO paste to form a first bottom solids component;
   washing the first bottom solids component;
   centrifuging the first bottom solids component to form a second bottom solids component;
   washing the second bottom solids component to form a GO material; and
   suspending the GO material in water to form the first suspension.

5. The method of claim 3, wherein the membrane support comprises poly(ethersulfone) and the base comprises an alkali material.

6. The method of claim 3, wherein the membrane comprises approximately 9.1 wt. % of the intercalating agent; and
   wherein the intercalating agent comprises polycyclic dye toluidine blue O (TBO).

7. The method of claim 3, wherein the intercalating agent has a mass ratio compared to GO of from 1:1 to 1:20; and
   wherein the intercalating agent limits interlayer swelling of the membrane by strong attachment of the π-conjugated polycyclic cations to the GO sheets.

8. The method of claim 3, wherein the conditioning comprises applying the transmembrane pressure from about 10 bar to about 50 bar.

9. The method of claim 3, wherein the conditioning comprises applying the transmembrane pressure from about 10 bar to about 50 bar from 1 hour to 48 hours.

10. The method of claim 3 further comprising:
    feeding a black liquor solution comprising 15% weight solids in water to the membrane under from about 10 bar to about 50 bar of transmembrane pressure;
    wherein the solids comprise at least one solid selected from the group consisting of lignin and organic carbon; and
    wherein the membrane has at least one of:
       a lignin rejection of 98% or greater;
       a total organic carbon rejection of 80% or greater; or
       a total solids rejection of 50% or greater.

* * * * *